Figure 3:
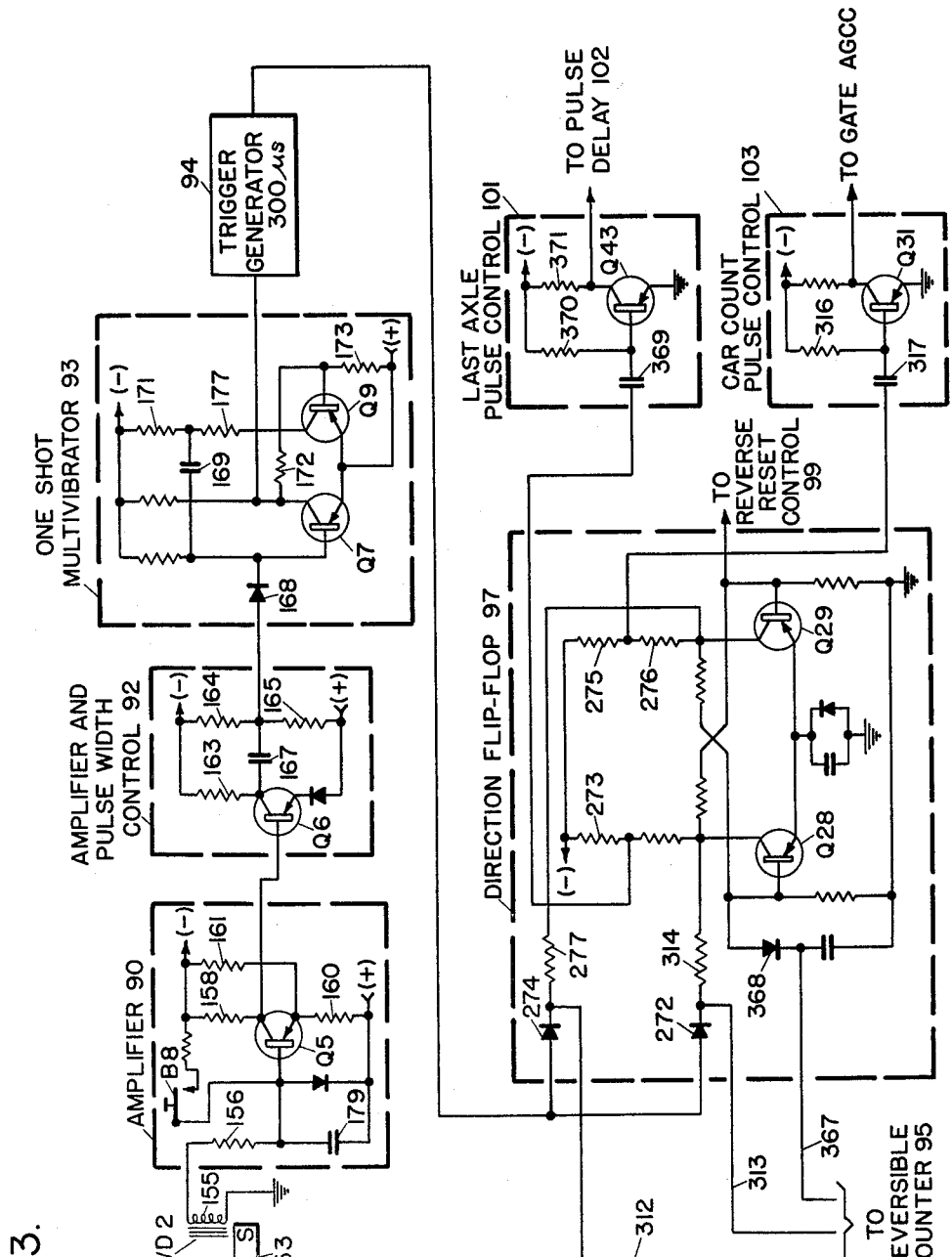

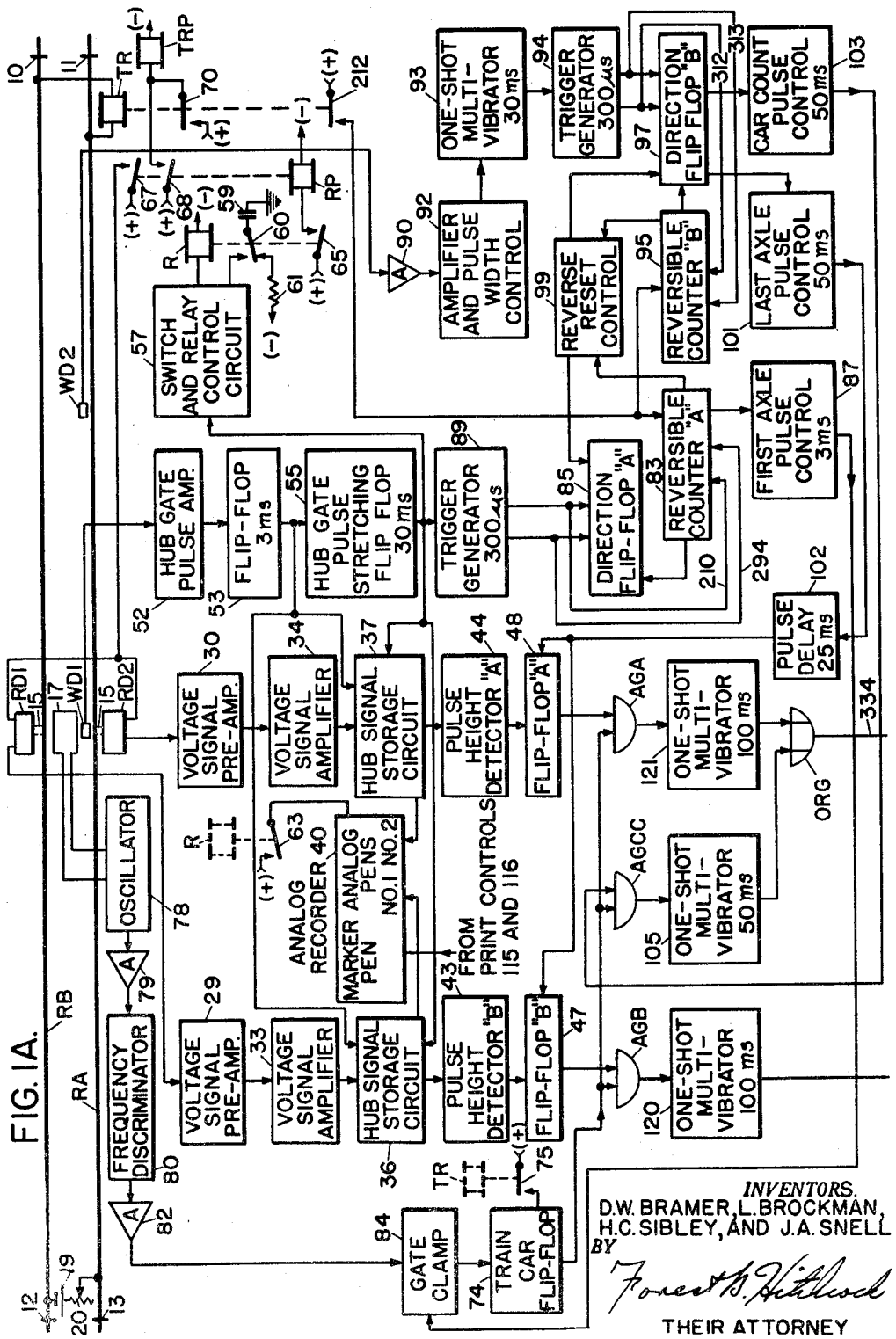

April 6, 1965
D. W. BRAMER ETAL
3,177,359
JOURNAL TEMPERATURE INFORMATION
RECORDING SYSTEM FOR TRAINS
Filed May 16, 1961
8 Sheets-Sheet 2
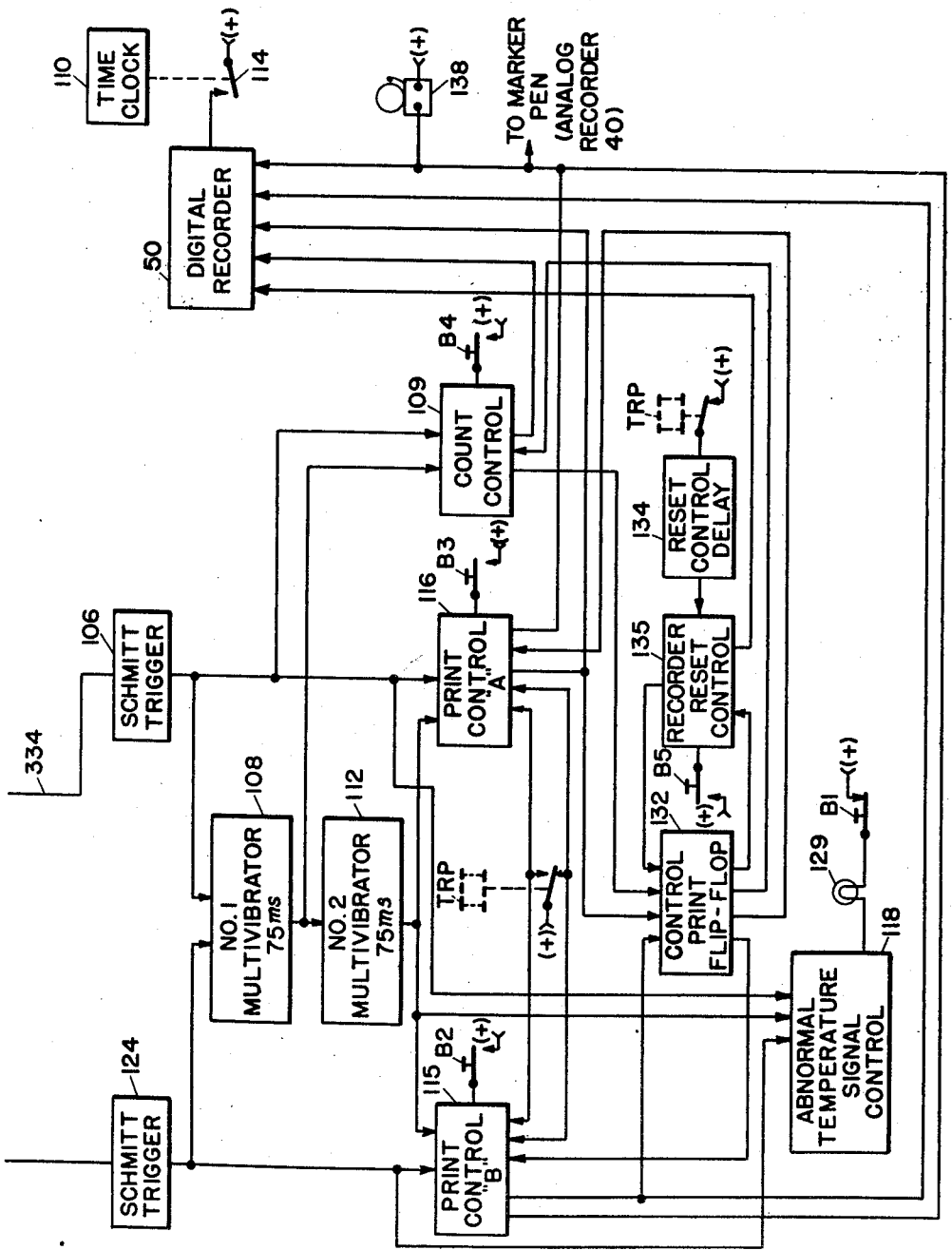
FIG. IB.
INVENTORS.
D.W. BRAMER, L. BROCKMAN,
H.C. SIBLEY, AND J.A. SNELL
BY
THEIR ATTORNEY

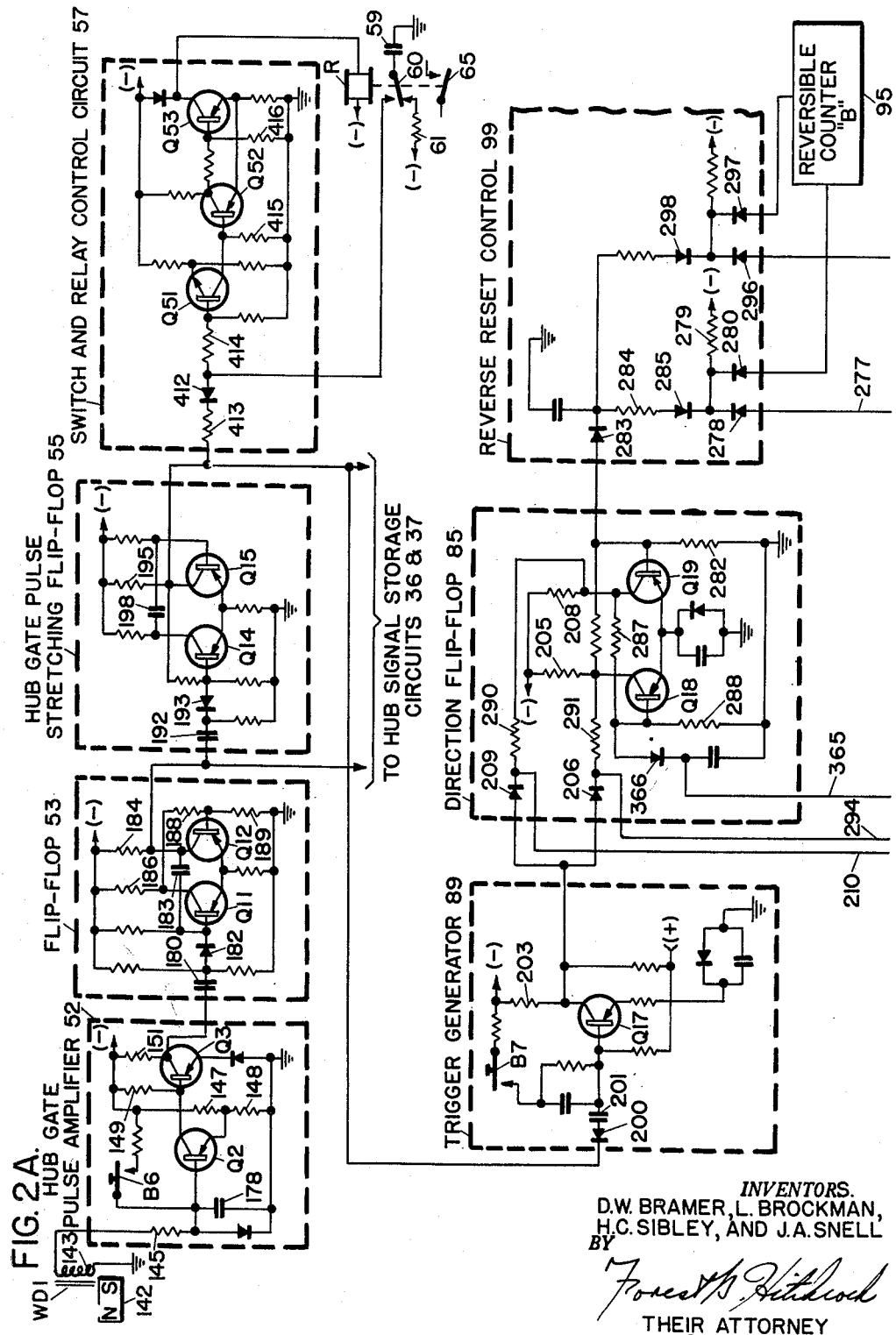

April 6, 1965

D. W. BRAMER ETAL 3,177,359

JOURNAL TEMPERATURE INFORMATION
RECORDING SYSTEM FOR TRAINS

Filed May 16, 1961

8 Sheets-Sheet 4

FIG. 2B.

*INVENTORS.*
D.W. BRAMER, L. BROCKMAN,
H.C. SIBLEY, AND J.A. SNELL
BY

Forest S. Hitchcock

THEIR ATTORNEY

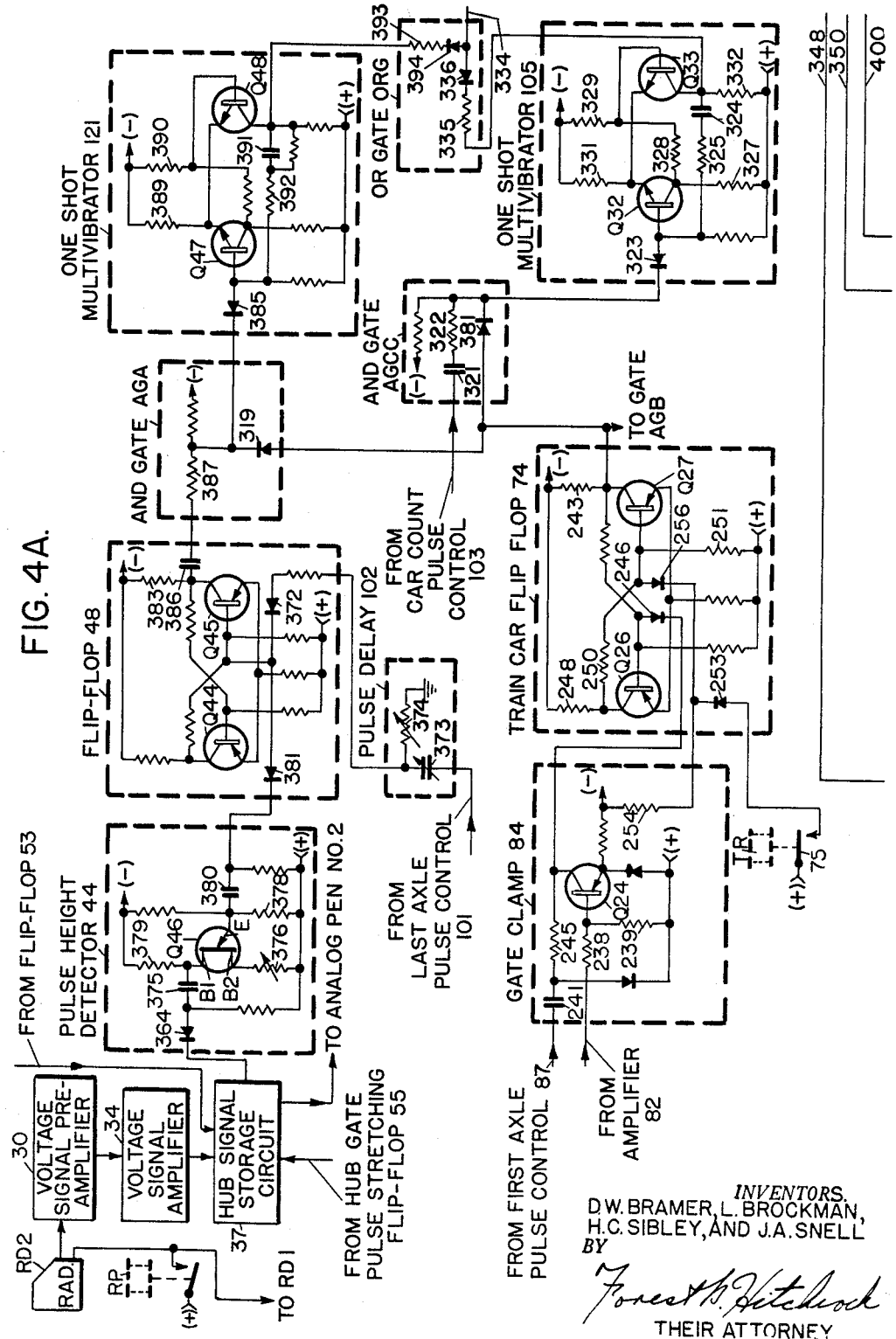

April 6, 1965    D. W. BRAMER ETAL    3,177,359
JOURNAL TEMPERATURE INFORMATION
RECORDING SYSTEM FOR TRAINS
Filed May 16, 1961    8 Sheets-Sheet 7
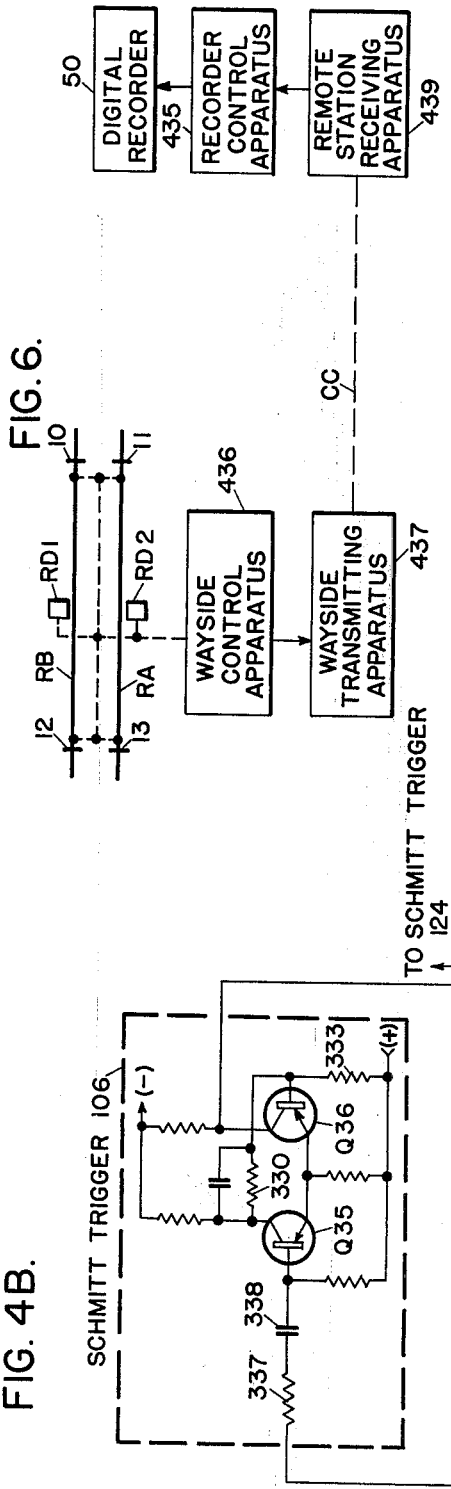
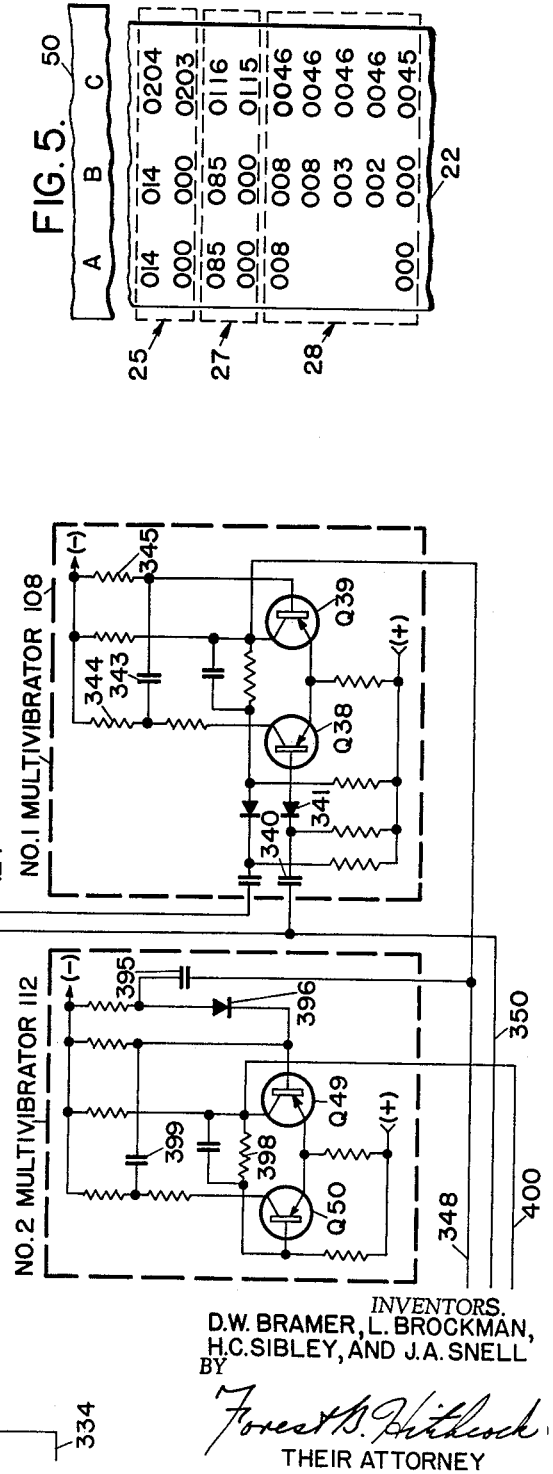
INVENTORS.
D.W. BRAMER, L. BROCKMAN,
H.C. SIBLEY, AND J.A. SNELL
BY
Forest D. Hitchcock
THEIR ATTORNEY April 6, 1965

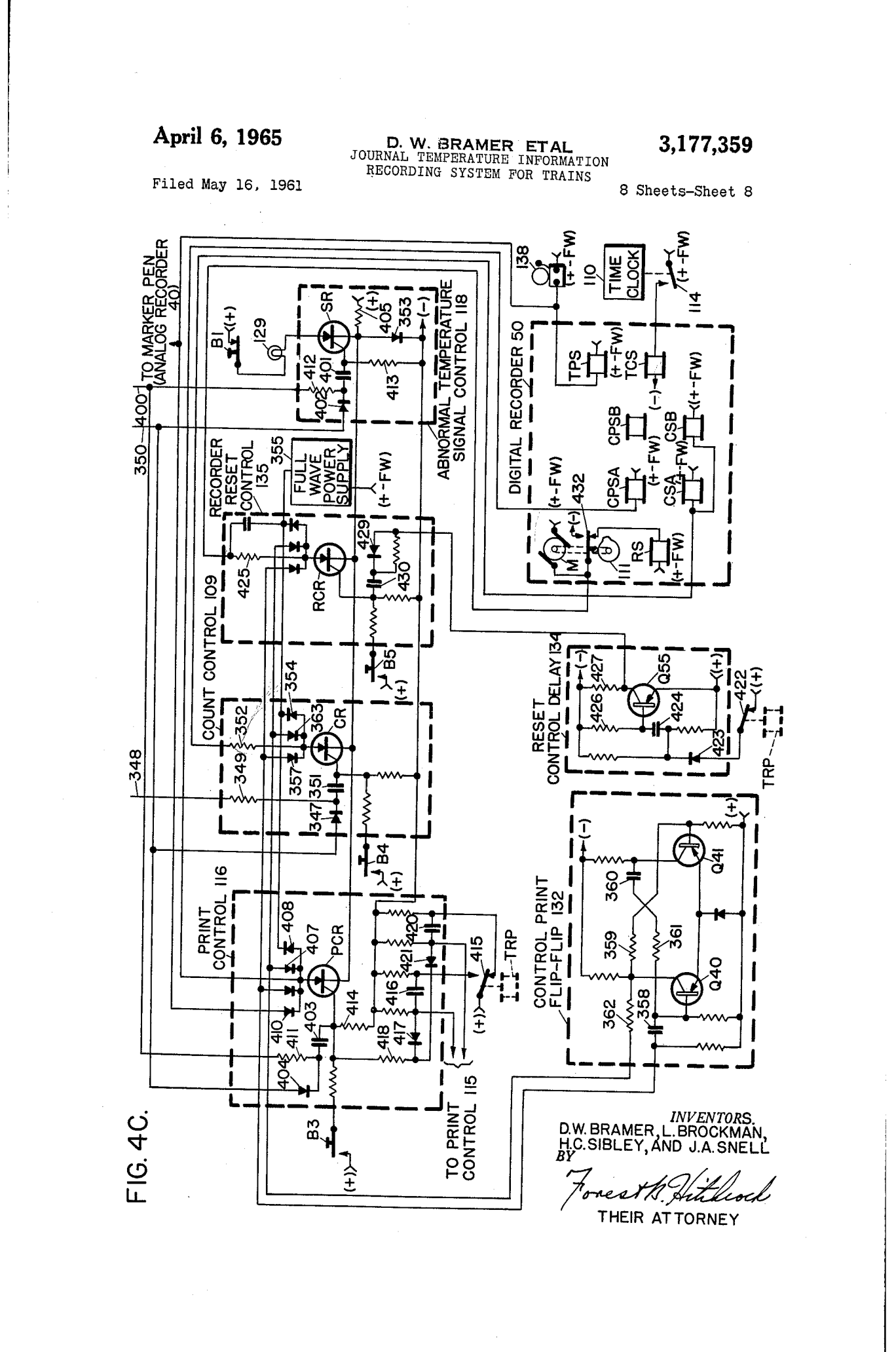

D. W. BRAMER ETAL  
JOURNAL TEMPERATURE INFORMATION  
RECORDING SYSTEM FOR TRAINS 3,177,359

Filed May 16, 1961

8 Sheets-Sheet 8

FIG. 4C.

*INVENTORS.*  
D.W. BRAMER, L. BROCKMAN,  
H.C. SIBLEY, AND J.A. SNELL  
BY

*Forest N. Hitchcock*

THEIR ATTORNEY

United States Patent Office 3,177,359
Patented Apr. 6, 1965

3,177,359
JOURNAL TEMPERATURE INFORMATION RE-
CORDING SYSTEM FOR TRAINS
Donald W. Bramer and Lyle Brockman, Rochester, and
Henry C. Sibley, Spencerport, and John A. Snell, Rochester, N.Y., assignors to General Signal Corporation,
a corporation of New York
Filed May 16, 1961, Ser. No. 110,528
15 Claims. (Cl. 246—169)

This invention relates to a journal temperature information recording system for trains, and, more particularly, pertains to such a system for providing a concise, but exceedingly self-explanatory and permanent record of journal temperature information for a passing train.

One of the problems existing from early times in American railroading has been overheated journal bearings on railway cars and the sometimes disastrous results occurring therefrom. An early attempt to combat this problem was to provide a detection means for each journal bearing on each railway car so as to detect an overheated condition separately therefor. This method of detection was recognized to be unduly expensive thus requiring other more economical systems. Systems were then devised which provide a detection system located along the trackway at designated points for viewing the journal boxes of railway cars with relation to different parts thereof. This type of system permitted the monitoring of trains passing the detecting location which materially reduced the cost of detection. A more recent type of detection system has provided for the viewing of the inside axle and the outside axle at the wheel hub. These recent types of detection systems have been employed to overcome the extraneous heat source affects exhibited by the journal box, one extraneous source being solar radiation.

In all of the systems of detection enumerated above, some means has been provided to indicate to a responsible person that an overheated journal bearing condition exists on a train and, more particularly, with respect to a specific car and wheel thereof. For the type of detection system provided with each wheel of a train, either a visual or a sound warning system was employed for apprising an attending operator or the engineer of the train of an overheated journal bearing condition. For the track side viewing type of system, it was thought necessary to provide a graphical recording of the analog signal outputs provided by the detecting devices. More recently, in connection with a track side viewing type of system a plurality of counting displays has been provided which are sequentially actuated according to the detection of separate overheated journal bearing conditions so as to provide a separate count from the respective wheels to the end of the train for facilitating in the loaction of such overheated journal bearing conditions.

It is immediately recognized that several drawbacks are present with the types of systems employed to apprise a responsible person of existing overheated journal bearing conditions and for providing a permanent type recording of the monitored train. As has been pointed out, the first type of detection system is employed to actuate a visual or sound warning system, but this fails to provide an indication of the particular location of a detected overheated journal bearing condition or a record which may be referred to at some later time for various purposes. The provision of a graphical recording of analog signal outputs from a track side detection system invariably provides a voluminous record which is difficult at times to interpret as well as requiring such interpretation at the time of train monitoring thus requiring a decision for stopping the passing train. The last mentioned type of track side detection system has provision for a number of counting displays anticipatory of the overheated journal bearing conditions which may be present on a passing train. It is possible in this type of system that an overheated journal bearing condition could remain undetected where an insufficient number of counting displays was provided. This type of system also requires a great deal of apparatus and, yet does not provide a sufficiently permanent recording.

The present invention proposes a system which may be utilized in combination with a track side monitoring system for providing a digital recording of journal temperature information for a passing train. More particularly, the present invention proposes to provide a digital recording including a print for the time of train entrance into a detecting zone, a print for the number of railway cars within the train, and a print for the time of train exit from the detecting zone. The present invention further proposes to provide a digital recording print of the railway car numbered sequentially beginning with the first car following the locomotive, regardless of the number of units in the locomotive, where an overheated journal bearing condition exists and the side of detection thereof with respect to the time of detection. The present invention further proposes that these prints be made in a minimum amount of space on a display tape with two prints being made for a passing train having no detectable overheated journal bearing conditions which requires only two tape spaces, while each detectable overheated journal bearing condition requires only one additional space.

A track side type of train monitoring system which is employable with the present invention is of the type shown and described in the pending application, Ser. No. 57,015, of H. C. Sibley et al., filed on September 19, 1960, now abandoned. Described briefly, this train monitoring system provides for the viewing of outside wheel hubs at an area which most nearly provides heat radiation which is directly characteristic of the journal bearing conditions. With the location of a detecting device such as a radiometer being such as to provide viewing normal to a rail, a gating means is included so as to demarcate the time of monitoring each wheel passing through the viewing area. The above mentioned pending application, Ser. No. 57,015, accomplishes this by employing a track instrument of the magnetic type for initiating the demarcated time of wheel axle hub viewing by the radiometer, while a timing circuit is employed to establish the demarcated limits of such viewing time.

In order that the number of railway cars may be counted from the locomotive of a passing train, a novel detection organization is provided for detecting the locomotive at the radiometer location for gating an included counting apparatus so as to register a count for each railway car following the locomotive, but which is employed for printing purposes only where an overheated journal bearing condition exists on a particular railway car and when the passing train leaves the detecting zone. The novel organization for detecting a locomotive includes a track coil which is located with respect to the location of the radiometers and the track instrument for demarcating the initial viewing time of the radiometers. Such track coil is associated with a circuit for distinguishing and detecting the locomotive (i.e., all its units) in accordance with the presence of a gear box or motor on the axle of the locomotive which is lower in position with respect to the track way than other metallic apparatus on the train.

After the locomotive is detected, a novel counting organization becomes effective to count the number of railway cars and other possible locomotives within the train with respect to the initial locomotive. This novel organization employs another track instrument of the magnetic type which is utilized with the first mentioned track instrument and located approximately nine feet therefrom for detecting the first axle, the last axle and the middle of each railway car passing thereover. The nine foot separation of the two track instruments has been selected in view of the spacing of wheels with respect to a diesel type locomotive as well as the spacing of wheels on trucks included with railway cars. More particularly, this novel organization includes a plurality of reversible counters which are employed to provide outputs according to the first axle detection, last axle detection and the middle of car detection as will be described more fully hereinafter.

The present invention provides several advantages not heretofore provided by prior recording systems. One such advantage is the provision of a permanent recording which is concise, but which provides a maximum of information with respect to journal bearing conditions on a passing train. Another advantage of this invention is the provision of a permanent recording which does not require interpretation by a responsible person, but which provides a print only according to a predetermined established amplitude of detected signal which is representative of an overheated journal bearing condition. Another advantage of this invention is the provision of an inexpensive and permanent recording for a plurality of trains which may pass through the detecting zone in relatively quick succession where the number of railway cars in each train may be extensively variable which distinguishes therebetween timewise as well as the exact number of cars in each train. Another advantage of this invention is the provision of a permanent, printed recording having the time printed thereon which identifies each particular train passing through a detecting zone so as to facilitate in train identification.

Thus, one object of this invention is to provide a system for detecting the entrance of a train into a defined detection zone and for causing a permanent record to be made as to the time and entrance thereof.

Another object of this invention is to provide a system for determining the presence of a locomotive for a passing train in relationship to the location of a journal temperature sensing means for rendering distinctive outputs provided by such means effective only for succeeding railway cars.

Another object of this invention is to provide a system for effecting a count registration of railway cars with respect to a locomotive where such counts are sequentially registered but which is effectively employed to provide a printed recording thereof only according to the detection of an overheated journal bearing condition for a particular railway car.

Another object of this invention is to provide a system for detecting overheated journal bearing conditions on both sides of a passing train where a permanent recording is made for each railway car having at least one overheated journal bearing condition and with respect to each side thereof.

Another object of this invention is to provide a system for counting the number of railway cars in a train passing through a defined detection zone and for causing the total car count registered to be printed on a permanent recording when the train is detected as exiting from the defined detection zone.

Another object of this invention is to provide a system for counting railway cars which distinguishes between cars within the same train having variable axled trucks where such count registration representative of a particular railway car is permanently recorded when at least one overheated journal bearing condition is detected therefor.

Another object of this invention is to provide a system which permanently records the time required for a train to pass through a defined detection zone and the number of railway cars in the passing train in a minimum of recorder tape space.

Other objects, purposes and characteristic features of this invention will be in part obvious from the accompanying drawings and in part pointed out as the description of the invention progresses.

In describing the invention in detail, reference will be made to the accompanying drawings in which like reference characters designate corresponding parts throughout the several views, and in which—

FIGS. 1A and 1B when arranged with FIG. 1A respectively above FIG. 1B is a block diagram of one embodiment of this invention;

FIGS. 2A and 2B when arranged with FIG. 2A respectively above 2B diagrammatically illustrates in detailed form the gating and counting circuits with respect to one magnetic track instrument;

FIG. 3 diagrammatically illustrates in detailed form the gating circuits with respect to a second magnetic track instrument;

FIGS. 4A, 4B and 4C when arranged with FIG. 4B respectively to the right of FIG. 4A and with FIG. 4A respectively above FIG. 4C diagrammatically illustrate in detailed form the circuit organization with respect to one radiometer unit and the digital recorder control circuits of this invention;

FIG. 5 is a portion of a tape illustrating printed recordings typical of this invention; and FIG. 6 is a combined block diagram and diagrammatical illustration showing one embodiment of this invention employed with a telemetering system.

To simplify the illustrations and facilitate in the explanation, the various parts and circuits constituting the embodiment of this invention have been shown diagrammatically and certain conventional illustrations have been employed. The drawings have been made to make it easy to understand the principles and mode of operation rather than to illustrate the specific construction and arrangement of parts that might be used in practice. The various relays and their contacts are illustrated in a conventional manner, and symbols are used to indicate connections to the terminals of batteries, or other sources of current, instead of showing all of the wiring connections to such terminals. Thus, the symbols (+) and (−) indicate connections to the opposite terminals of a source of relatively low voltage suitable for the operation of various relays and transistor circuits and a symbol for a ground connection indicates a connection to a voltage terminal intermediate that of the (+) and (−).

FIG. 1A diagrammatically illustrates two rails RA and RB which are shown as being part of a track section defined by the insulated joints 10, 11, 12 and 13. A radiometer detector RD1 is located adjacent the rail RB and a similar radiometer detector RD2 is located adjacent the other rail RA. Each of these radiometer detectors is positioned to view or scan in the direction designated by the dotted lines 15, i.e. generally normal to the rails RA and RB. The detection of each wheel which passes the location of radiometer detectors RD1 and RD2 is accomplished by wheel detector WD1 which is normally connected to the rail RA, as shown, while an additional wheel detector WD2 is located to the right of wheel detector WD1 on rail RA a distance of approximately nine feet as will be hereinafter more fully described. A coil 17 is disposed between the rails RA and RB and intermediate the opposing locations of radiometer detectors RD1 and RD2 for detecting and distinguishing the locomotive of a passing train. A track circuit including a track relay TR, a battery 19 and a resistor 20 is provided to detect the entrance and exit of a passing train in relation to the defined track section.

Each of the radiometer detectors RD1 and RD2 is of the type shown and described in the above mentioned pending application Ser. No. 57,015 which includes an optical system comprising a reflecting element for focusing the heat radiation from a passing wheel onto an infra-red responsive element so that an electrical output signal is obtained therefrom which is proportional in amplitude to the heat radiated from the object viewed or scanned. Included with each radiometer detector RD1 and RD2 is a shutter element which is normally closed or in a blocking position for protecting the optical system from extraneous infra-red energy such as solar energy but which is operated to a non-blocking position when a train is detected as being present within the defined track section or what may be considered as a detection zone. The manner in which (+) energy is supplied to the included shutter solenoids for radiometer detectors RD1 and RD2 will be explained more fully hereinafter.

Each of the wheel detectors WD1 and WD2 is a track instrument of the type which is normally affixed to the track rail or rails and which provides an accurate indication as to the relative position of each passing wheel with respect to the radiometer detectors RD1 and RD2. The particular track instrument illustrated in the accompanying drawings, particularly FIG. 2A and FIG. 3, and which has been found to work well in practice employs a permanent magnet with an associated iron core coil affixed to the track rail at a preselected location. As the wheel flange of each wheel passes through an inductive coupling relationship made with the coil, there is a distinctive change in the flux which is provided by the permanent magnet and which links with the turns of the coil. As a result, a voltage is induced in the coil, and this voltage is applied to an associated electronic circuit and acts thereon to cause it to apply a distinctive output pulse of uniform amplitude to the associated gating circuits.

The coil 17 which is located intermediate the radiometer detectors RD1 and RD2 and between rails RA and RB may be employed as part of a tank circuit of an oscillator type circuit which is rendered effective according to the presence of a locomotive, and more particularly the presence of a motor or gear box with respect to the first axle of such locomotive, to provide an output which is representative of a detected locomotive.

GENERAL MANNER OF OPERATION

Before proceeding with the detailed description of the circuit organization of this invention, a generalized description will be given with respect to the block diagram of FIGS. 1A and 1B, the detailed circuit diagrams of FIGS. 2A, 2B, 3, 4A, 4B, and 4C, and the portion of the tape presentation shown in FIG. 5. In the description to be presented for the present embodiment, various output signals having specific time durations are provided by the various circuits so as to effect the proper timing with respect to a passing train. It should be understood that these indicated time durations may be altered with the objects of this invention being retained. It is considered appropriate, however, to first discuss the tape presentation shown in FIG. 5 in relation to the different information shown thereby before proceeding with this generalized description.

Referring to FIG. 5, the portion of tape 22 shows three columns of figures having designations A, B and C which are disposed on a portion of digital recorder 50. Column C is representative of the time that a train enters the detection zone, the intermediate times, if any, when overheated journal bearing conditions are detected for particular cars, and the time of leaving of the train from the detection area, all times being printed in twenty-four hour time. The columns A and B represent prints made with respect to each side of a passing train and more particularly with respect to rails RA and RB respectively. A first print is made for each of the columns A and B when a train is detected as entering a defined detection zone and a second print is made when such train is detected as leaving the detection zone with the number of cars being included in such second print as shown on the tape 22. One such printing made with respect to one train is enclosed in dotted lines designated 25. This printing shows the time of train entrance into the defined detection zone as being "0203" while a printing of "000" is additionally made for columns A and B. A similar print of the time is made when the train is detected as leaving the detection zone and is indicated to be "0204," while the number of cars in the train is printed for columns A and B and is indicated to be "014." A similar printing for another train is included in the dotted lines designated 27 which provides prints for the times "0115" and "0116" of entrance into and exit from respectively the detection zone while printing the number of cars at "085." It is obvious from the prints made at 25 and 27 that the number of cars may be extensively variable, but only two spaces are required on the tape 22 for providing a permanent record of train passage.

The tape 22 includes prints made for another train which entered the detection zone at time "0045" and exited from the detection zone at time "0046" with "008" cars being printed which is representative of the number of cars in the passing train. Also, the cars "002," "003," and "008" located with respect to the locomotive are indicated to have at least one overheated journal bearing condition with respect to column B and rail RB. The time "0046" is additionally printed for each of these cars. The prints made for this particular train are included within in the dotted line designated 28.

Each output signal of radiometer detectors RD1 and RD2 shown in FIG. 1A is a low level, unidirectional output voltage, and this must be substantially amplified in order to be of use. The common technique of D.C. amplification is employed in the present invention and this is shown more particularly in the above mentioned pending application Ser. No. 57,015 to be a voltage signal pre-amplifier such as voltage signal pre-amplifiers 29 and 30 associated respectively with radiometer detectors RD1 and RD2. The amplified outputs taken from voltage signal preamplifiers 29 and 30 are respectively supplied to voltage signal amplifiers 33 and 34 where the respective signals are further amplified. Each of the voltage signal amplifiers 33 and 34 includes an adjustment circuit employed for the purpose of establishing the desired gain of amplifiers 33 and 34. Amplified outputs supplied from amplifiers 33 and 34 are respectively applied to hub signal storage circuits 36 and 37 where they are stored for a predetermined time and are then used to operate analog pens of an analog recorder 40 as well as being supplied to respective pulse height detectors 43 and 44. The pulse height detectors 43 and 44 include adjustment circuits which are employed to determine the height of the pulses received from respective radiometer detectors RD1 and RD2 which are usable and indicative of overheated journal bearing conditions for causing respective prints such as shown in FIG. 5. The outputs supplied from the pulse height detectors 43 and 44 are respectively supplied to flip-flops 47 and 48 each of which is effective to store such pulse for a predetermined time until used. The outputs supplied by the flip-flops 47 and 48 are respectively used only according to the detection of the first axle of a railway car following an initial locomotive which causes gating circuits AGB and AGA to be rendered effective for passing the signals supplied from flip-flops 47 and 48.

It is evident from the descriptions provided above with respect to FIGS. 1A and 5, and, more particularly, the recording made within the dotted lines 28 with respect to overheated journal bearing conditions, an output signal must be derived from the radiometer detectors RD1 and RD2 for each respective wheel scan for each railway car. As a train passes the radiometer detector location, radiometer detectors RD1 and RD2 respectively view or scan the portions of the wheel as well as other parts of the railway cars and even more may be exposed to other sources of infra-red radiation emanating from passing railway cars. This demonstrates the need for using gating circuits so that the output signals of the radiometer detectors RD1 and RD2 will, in effect, be interrogated to determine whether an overheated journal bearing condition exists only at the very instant that the scan of each radiometer detector at least partially includes the wheel hub of a wheel included with a passing railway car.

Various detection devices may be used to control the gating circuits so that each radiometer detector RD1 and RD2 will have its output signal interrogated at the desired times. To effect this result, it has been found practical to provide a track instrument of the magnetic type, as described above, affixed to the track rail or rails, which provides an accurate indication as to the relative position of each passing wheel with respect to the radiometer detectors RD1 and RD2. The magnetic track instrument illustrated in FIG. 2A and designated WD1 includes a permanent magnet 142 with an associated iron core coil 143 which is normally affixed to the track rail at a preselected location. Similarly, the magnetic track instrument illustrated in FIG. 3 and designated WD2 includes a permanent magnet 153 with an associated iron core coil 155 which is normally affixed to the track rail at another preselected location, as shown in FIG. 1A. The passing of a wheel over each detector WD1 or WD2 causes a voltage to be induced in the respective coil as described above, and this voltage is applied to an associated electronic circuit and acts thereon to cause it to apply a distinctive output pulse of uniform amplitude to the associated gating circuits.

The electronic circuit which is effective according to the outputs from the wheel detector WD1 provides a pulse of predetermined width for interrogating the wheel hub of a passing wheel for only the length of the pulse width. In addition, this predetermined width pulse is employed to operate a pulse stretching circuit which effectively provides a pulse of longer duration for controlling the use of stored signals which are representative of radiometer detector signal outputs.

Referring to FIG. 1A, each output from wheel detector WD1 is supplied to hub gate pulse amplifier 52 which is provided for amplifying such pulse. An amplified gating pulse is then supplied to a flip-flop 53 which is initially controlled thereby for providing a distinctive output pulse of approximately three milliseconds in duration which is supplied to the circuits 36 and 37 mentioned above for causing these circuits to effectively store signal outputs received from respective radiometer detectors RD1 and RD2 representative of hub temperatures and journal bearing temperatures. The output pulse from flip-flop 53 is also supplied to a hub gate pulse stretching flip-flop 55 which is provided to lengthen the width of such output pulse to approximately thirty milliseconds. The lengthened output pulse supplied from flip-flop 55 is usable to effect the control of circuits 36 and 37 for permitting the stored pulses, if any, to be used with an analog recorder 40, to control a switch and relay control circuit 57 and to control the detectors 43 and 44 respectively.

A relay R is also provided and is controlled by circuit 57 when such circuit 57 receives an input from flip-flop 55. As a train passes the radiometer location in either direction, flip-flop 55 is operated for each passing wheel to the condition wherein it provides the required gating voltage for operating circuit 57 which insures that relay R is energized for each passing wheel. To insure that the relay R remains energized for a predetermined period following the operation of flip-flop 55 to its nongating condition, a capacitor 59 which is normally charged through back contact 60 of relay R and a resistor 61 is effective to hold the relay R energized for a predetermined period after the gating voltage from flip-flop 55 ceases. Thus, for a train that passes the radiometer location, relay R remains energized, while for a train that stops in the vicinity of the radiometer location, relay R is deenergized in a short period of time, which may be several seconds, following the passage of the last wheel over wheel detector WD1.

One use that is made of the relay R is to control the motor operation of the analog recorder 40 through its front contact 63. When this front contact 63 closes upon the arrival of a train at the radiometer location, positive (+) energy is applied through such contact 63 and to the recorder 40 to set it into operation.

An additional function of the relay R involves its control of a repeater relay RP which control is effected through a front contact 65 of relay R.

When the relay RP is controlled, it functions to control the shutters included with radiometer detectors RD1 and RD2 to a nonblocking position through a front contact 67. Also, it functions to control a stick circuit for track repeater relay TRP through a front contact 68. The track repeater relay TRP is initially energized when a train is detected as being in the defined detection zone irrespective of the direction of entrance therein as relay TR is deenergized in the usual manner for controlling relay TRP through its back contact 70.

In order that gates AGB and AGA associated with radiometer detectors RD1 and RD2 respectively are effectively controlled to pass the output signals provided by respective flip-flops 47 and 48, a train car flip-flop 74 must have been controlled only according to the absence of detection of all initial locomotive of a passing train. As a train is detected as entering the defined track section or detection zone and relay TR is deenergized, train car flip-flop 74 is placed in a biased condition according to positive (+) energy being received through the closed back contact 75 of relay TR. As the motor or gear box disposed adjacent the first axle of the locomotive comes into the vicinity of track coil 17, oscillator 78 becomes effective to provide an output signal which is amplified by amplifier 79 and detected by frequency discriminator 80. The detected signal is then amplified by amplifier 82 and applied to gate clamp 84. In addition, a first axle pulse provided by a first axle pulse control 87 is also supplied to the gate clamp 84. The presence of these two pulses substantially simultaneously provides that gate clamp 84 be ineffective to pass such first axle pulse to flip-flop 74. In the absence of the locomotive detection pulse and in the presence of the first axle pulse from control 87, gate clamp 84 permits a first axle pulse to be passed to flip-flop 74 which is controlled to an opposite condition thereby for rendering gates AGB and AGA effective for passing output signals supplied thereto. In addition, a third gate AGCC is similarly rendered effective to pass car count pulses as will be further described hereinafter.

Output pulses provided by wheel detector WD1 and other output pulses provided by wheel detector WD2, each representative of a passing wheel, are effective to control counting circuits for providing control gating pulses which are representative of the first axle for each railway car, the last axle for each railway car, and a car count pulse for each railway car.

With respect to wheel detector WD1, each output pulse derived from flip-flop 55 is supplied to trigger generator 89 where it is inverted and shortened in duration and thereafter supplied to a reversible counter 83 over one of two inputs according to the existing condition of a direction flip-flop 85. In either operated condition of direction flip-flop 85, a biasing circuit is provided which causes output pulses from generator 89 to be effective for controlling counter 83 to register counts in either a forward or reverse direction. When the first axle of the locomotive and each railway car in a passing train causes wheel detector WD1 to provide an output pulse, irrespective of the direction of such train, reversible counter 83 is operated to a count registering condition representative of such passages which causes each output pulse supplied to first axle pulse control 87 to render such control 87 effective for a predetermined time. During such time, a short pulse of approximately three milliseconds is supplied to gate clamp 84 and which is further supplied to flip-flop 74 provided the first axle detected as passing wheel detector WD1 is the first axle of a railway car following the locomotive.

For each wheel that passes wheel detector WD2, an output pulse is provided thereby similar to that provided by wheel detector WD1 which is first supplied to an amplifier 90 where it is amplified and then supplied to an amplifier and pulse width control 92. The function of control 92 is to further amplify such pulse and to determine the pulse width which is characteristic of a passing wheel and to exclude those pulses occurring from extraneous sources. To insure that the extraneous pulses which may occur after a pulse of proper width is accepted which is characteristic of a passing wheel, the first output pulse of proper width from control 92 is supplied to a one-shot multivibrator 93 which is controlled to an opposite condition for approximately thirty milliseconds thus excluding any extraneous pulses picked up thereafter by wheel detector WD2. A negative-going output is supplied from multivibrator 93 to a trigger generator 94 similar to trigger generator 89 mentioned above. Similarly, trigger generator 94 provides a shorter positive-going pulse of approximately three hundred microseconds which is supplied to a reversible counter 95, and more particularly, to one of two inputs according to the existing condition of direction flop-flop 97. In one operated condition of direction flip-flop 97, counter 95 is controlled by such pulses to count in a forward direction, while in a second operated ocndition of flip-flop 97, counter 95 is controlled by such pulses to count in a reverse direction. A reverse reset control 99 is effective when counters 83 and 95 come into coincidence in at least one instance as to their registered counts for controlling respective flip-flops 85 and 97 to respective operated conditions where reverse operation of counters 83 and 95 becomes effective, while separate control of counters 83 and 95 to a zero count registering position causes respective control of flip-flops 85 and 97 where forward operation of counters 83 and 95 becomes effective.

It has been mentioned above that the distance between wheel detectors WD1 and WD2 is approximately nine feet. According to this distance, it is obvious that two wheels on a two wheel truck or three wheels on a three wheel truck would be effective to actuate either wheel detector WD1 or wheel detector WD2 before actuating the other wheel detector according to the direction of a passing train. Irrespective of the direction, however, direction flip-flop 97 is effective to provide a last axle pulse according to the control of last axle pulse control 101 when the last axle of a railway car is detected as passing wheel detector WD2. Such last axle pulse is supplied from control 101, through pulse delay 102, to the flip-flops 47 and 48 for causing such flip-flops 47 and 48 to be controlled to an original condition only provided an overheated journal bearing condition has been detected on a respective side of the particular car. In this operation, it has been considered necessary to include pulse delay 102 in order that the last wheel on a railway car included in a train traveling from right to left over rails RA and RB in FIG. 1A has sufficient time to enter the scanning area of radiometer detectors RD1 and RD2 as defined by dotted lines 15. This pulse delay is indicated to be approximately twenty-five milliseconds, but it should be understood that this delay could be altered to meet various traffic conditions which arise.

When direction flip-flops 85 and 97 are conditioned, however, after all the wheels on a first truck for a railway car have passed both wheel detectors WD1 and WD2 to thus cause counters 83 and 95 to register coincident counts thereon, an output pulse is derived from flip-flop 97 and supplied to car count pulse control 103 which is then effective to produce an output pulse of approximately fifty milliseconds in duration which is supplied to count control gate AGCC for car counting purposes.

From the description provided above, it is obvious that a car count pulse, a first axle pulse, and a last axle pulse will be provided irrespective of the detection by either radiometer detector RD1 and RD2 of an overheated journal bearing condition on at least one wheel for each side of a particular railway car. In each such case, the car count pulse is employed through gate AGCC to control a one-shot multivibrator 105 which provides an output pulse of fifty milliseconds' duration and this is supplied to a Schmitt trigger 106 through an OR gate ORG. An output pulse of approximately fifty milliseconds in duration is then taken from Schmitt trigger 106, and supplied to No. 1 multivibrator 108 as well as to count control 109. Count control 109 is then effective to advance the count solenoids CS for both columns A and B of digital recorder 50. Before proceeding with the further description hereof, it is considered convenient to provide a brief description of the digital recorder 50 shown in block form in FIG. 1B and in more detailed form in FIG. 4C.

As shown in FIG. 4C, digital recorder 50 includes a time control solenoid TCS which is adapted to be intermittently energized according to the operation of a time clock 110 which functions to establish the time. Time print solenoid TPS is included and adapted to be energized when a train leaves the detection zone, and for each overheated journal bearing condition which is detected according to this invention for effecting a time print in twenty-four hour time. A count solenoid CS for each of the columns A and B is provided which is adapted to be energized each time a car count is registered. A count print solenoid CPS for each of the columns A and B is provided and controlled when at least one detected overheated journal bearing condition exists on the respective side of a railway car for a passing train.

Generally speaking, printing of the car count registrations and time is accomplished through solenoid operated platens which are adapted to force typewriter-like paper and carbon into contact with included printing heads. Upon release of a particular solenoid, an included ratchet mechanism advances the paper one printing position in order that the next printing cycle may be effected. In this type of digital recorder, it is possible to supply a number of separate solenoids and platens to provide selective printing of included individual printing heads. It is noted that this type of digital recorder may be similar to the model ZDG1 manufactured by the Presin Company located in Santa Monica, Calif.

It is also noted that this type of digital recorder includes reset control apparatus which becomes effective, in this embodiment, at a predetermined time after the total car count registration is printed when a train leaves the detection zone. The control apparatus for effecting this reset control includes a reset solenoid RS, a motor M, and a cam 111 controlled by the motor M, the operation of these apparatuses being explained in more detail hereinafter.

A No. 2 multivibrator 112 is controlled for a predetermined time of approximately seventy-five milliseconds at the conclusion of operation of multivibrator 108. During such operation of multivibrator 112, a biasing circuit is provided for rendering effective print control 115, print control 116 and abnormal temperature signal control 118. It is obvious here that a fifty millisecond pulse provided by multivibrator 105 and amplified and squared by Schmitt trigger 106 is effective only to bias count control 109 and multivibrator 108. If, however, output pulses of approximately one hundred milliseconds are provided by respective one-shot multivibrators 120 and 121 and supplied to respective Schmitt triggers 124 and 106, the biasing circuit provided for print controls 115 and 116 and signal control 118 is effective during the time that the pulses from multivibrators 120 and 121 are provided. Thus, controls 115 and 116 may be effective during this time to provide control of respective count print solenoids CPSB and CPSA in the digital recorder 50 while control 113 is effective to provide control of an abnormal temperature signal 129.

Print controls 115 and 116 are additionally operated according to the control of relay TRP when a train is detected as entering the detection zone and also when a train is detected as exiting from the detection zone for respectively causing digital recorder 50 to print a "000" for columns A and B and to print the number of registered car counts also for columns A and B. This will be described more fully hereinafter.

In order that printing of the registered car counts may be effected, a control print flip-flop 132 is provided for the purpose of sustaining energization of print controls 115 and 116 and count control 109. At the time of such printing i.e., when the train is detected as having left the detection zone, a reset control delay 134 is controlled by the release of relay TRP which provides additional delay time to effect this printing operation which thereafter controls a recorder reset control 135 which provides for controlling digital recorder 50 to an initial condition in readiness for the next train which passes the radiometer detector location.

When either print control 115 or 116 is controlled to a condition which is representative of a detected overheated journal bearing condition, an output signal is provided to energize a bell 138 and to supply control energy to a marker pen of analog recorder 40 so as to provide identification of the particular car having the overheated journal bearing condition.

DESCRIPTION OF DETAILED CIRCUITS

The detailed circuits shown in FIGS. 2A, 2B, 3, 4A, 4B and 4C will presently be described in order that a more complete understanding of the present invention can be obtained. In this connection, the circuits shown in FIGS. 2A and 2B are those which are associated with the wheel detector WD1, while the circuits shown in FIG. 3 are those which are associated with wheel detector WD2. Also, the circuits shown in FIGS. 4A, 4B and 4C are those which are associated singly with radiometer detector RD2 and jointly with both radiometer detectors RD1 and RD2. It should be understood that similar circuits are provided for radiometer detector RD1 as is obvious from the block diagram of FIGS. 1A and 1B, but these will not be described in detail.

In the detailed circuit embodiment of this invention as shown in FIGS. 2A, 2B, 3, 4A and 4C, a number of transistors have been employed. Generally speaking, these transistors take the form of PNP type transistors and NPN type transistors. The PNP type transistor is a three element transistor, these elements being an emitter, collector and base. It is noted that in the symbol employed, the emitter has an arrow therewith directed toward the base. The NPN type transistor also includes three elements, these being an emitter, a collector and a base. It is noted that in the symbol employed, the emitter includes an arrow directed away from the base. In operating these types of transistors, it is generally noted that the PNP type transistor requires a negative (—) potential applied to its base with respect to the emitter thereof for conduction, while the NPN type transistor requires a positive (+) potential applied to its base with respect to its emitter for conduction thereof. During the description of the included detailed circuits, it is requested that this general information be kept in mind.

Wheel detector circuits

With reference to FIG. 2A, it is seen that wheel detector WD1 includes magnet 142 which is normally affixed to the track rail in such a manner that the flange on each passing wheel moves into and subsequently out of an inductive coupling relationship with the magnetic flux established by the permanent magnet. As a result of the flux change that occurs, a voltage is induced in an associated coil 143 having a voltage wave shape of generally sine-wave form. This voltage is applied to hub gate pulse amplifier 52 and, more particularly, the negative-going portion thereof is applied effectively to the base of transistor Q2 through a resistor 145 to cause such transistor Q2, which is normally nonconducting, to conduct depending upon the effectiveness of its emitter biasing circuit which includes resistors 147 and 148. Conduction of transistor Q2 causes the base of transistor Q3 to be placed at a positive (+) potential due to the voltage drop across resistor 149. The normally conducting transistor Q3 is thus cut off for a period of time according to the conductive condition of transistor Q2. During the cut off period of transistor Q3 a negative-going output pulse is derived from its collector circuit and one side of resistor 151 and applied to flip-flop 53. As pointed out above, flip-flop 53 produces an output signal of approximately three milliseconds duration which is used as a gating voltage for limiting the duration of time that radiometer detectors RD1 and RD2 scan the hub portion of each wheel for a passing train.

With reference now to FIG. 3, it is seen that wheel detector WD2 also includes a magnet 153 which is normally affixed to the track rail similar to that described for wheel detector WD1. A passing wheel is effective to similarly cause a change in flux which produces a voltage of generally sine-wave form as induced in an associated coil 155. This voltage is applied to the base of transistor Q5 through a resistor 156 for causing such transistor Q5, which is normally nonconductive, to become conductive in response to the negative-going voltage of wheel detector WD2 and to be turned off by the next positive-going voltage of wheel detector WD2. A negative-going output pulse is derived from the collector of transistor Q5 and one side of resistor 158 during the nonconductive period of transistor Q5. Resistors 160 and 161 are included in an emitter biasing circuit for transistor Q5. The turning on of transistor Q5 reduces the negative bias that normally maintains transistor Q6 turned on so as to turn off transistor Q6. In view of the relative position of wheel detector WD2, extraneous pulses other than produced by a passing wheel may occur which are effective to operate amplifier 90 and transistor Q5 thereof for causing the operation of transistor Q6 in control of 92. The time constant provided by the values of resistors 163, 164 and 165 and capacitor 167 is understood to be such as to eliminate extraneous noise spikes less than a predetermined width which may occur immediately after transistor Q6 has been turned off.

The capacitor 167 has its left hand side effectively shifted between connection to a positive or negative source by the on and off conditions respectively of transistor Q6. When transistor Q6 is turned on, the left hand side of capacitor 167 has a relatively low resistance connection through the transistor Q6 to (+). When transistor Q6 is turned off, there is little current flowing through resistor 163 and the left hand side of capacitor 167 is effectively at negative potential.

The transistor Q6 is normally on, and is turned off when a car wheel enters the wheel detector WD2. The turning off of transistor Q6 reverses the charge on capacitor 167 which does not trigger the one shot multi-vibrator 93. The time required to reverse the charge suppresses triggering the multivibrator 93 by noise which may momentarily turn Q6 on again.

When a car wheel leaves the detector WD2, a positive going pulse is generated in the detector which turns off transistor Q5 and in turn causes transistor Q6 to be turned on. The turning on of transistor Q6 effectively connects the capacitor 167 across the base and emitter of transistor Q7 to apply a positive going pulse to the base of transistor Q7 to turn that transistor off.

To further assure that the noise spikes occurring after an accepted pulse having a width greater than the predetermined acceptable pulse width are not accepted, one-shot multivibrator 93 is initiated into control by the turning on of transistor Q6 of control 92 for a period of approximately thirty milliseconds. This time period permits the effective operation of the remaining circuits thus preventing any erroneous operation thereof.

The positive-going output pulse supplied from control 92 is applied to the base of transistor Q7 through a steering diode 168 to cause the normally conducting transistor Q7 to be cut off. In addition, the positive-going output pulse is applied to one side of a capacitor 169 which causes a charging action thereof through a resistor 171 to result. A second transistor Q9 included with multivibrator 93 is normally in a nonconducting condition inasmuch as its base is biased to a positive (+) potential through resistor 172 and 173 due to the conduction of transistor Q7. As transistor Q7 begins to cut off, the base of transistor Q9 is biased to a more negative (−) potential according to the collector of transistor Q7 becoming more negative (−). In addition, the charging capacitor 169 causes the collector of transistor Q9 to be placed at a negative (−) potential through a resistor 177 to the extent that transistor Q9 begins to conduct while transistor Q7 is cut off. Multivibrator 93 remains in this state until the capacitor 169 is sufficiently discharged according to the circuit components. As mentioned above, this time is assumed to be approximately thirty milliseconds in order that remaining circuits may have sufficient time to operate properly.

It will be noted with respect to amplifiers 52 and 90 shown respectively in FIGS. 2A and 3 that respective capacitors 178 and 179 are connected across respective coils 143 and 155. The inclusion of such capacitors 178 and 179 tends to prevent erroneous circuit operation from stray frequencies.

*First axle detection and control circuits*

Referring to FIGS. 2A and 2B, a description may now be provided for the circuits shown therein for producing a first axle pulse which is representative of the first axle detection for each railway car as well as the locomotive and any other locomotives which may be a part of a passing train.

The negative-going output pulse supplied by amplifier 52, as described above, is applied to the base of a transistor Q11 included with flip-flop 53 which transistor Q11 is normally conducting. Such negative-going pulse is first differentiated by capacitor 180 with the resulting positive-going spike thereof being applied to the base of transistor Q11 through steering diode 182. This positive-going spike is also applied to one side of a capacitor 183 which causes a charging action to be initiated therefor through a resistor 184. Transistor Q11 starts to decrease in conduction thus causing a cut off biasing circuit for a second transistor Q12 to become less effective. As transistor Q11 ceases conduction, a substantially negative (−) potential is applied to the base of transistor Q12 due to the absence of substantially ground potential on the collector of transistor Q11 and one side of resistor 185. The base of transistor Q12 is now placed at a sufficiently negative (−) potential due to the biasing circuit including resistors 186, 188 and 189, while its collector is also placed at a negative (−) potential through resistor 184 sufficient to cause transistor Q12 to become conductive while transistor Q11 is cut off. This conduction exists for a period of approximately three milliseconds as determined by the timing circuit including capacitor 183. Thus, for such predetermined period of time, flip-flop 53 provides a positive-going voltage output pulse which is supplied to the hub gate pulse stretching flip-flop 55 and to hub signal storage circuits 36 and 37.

The positive-going output pulse supplied from flip-flop 53 to flip-flop 55 is effective to cause a reversal of conditions of such flip-flop 55 for thus causing a negative-going output pulse having a duration in the order of thirty milliseconds to be supplied to trigger generator 89 and circuit 57. More particularly, flip-flop 55 which includes transistors Q14 and Q15 is normally in the condition where transistor Q15 is conductive and transistor Q14 is cut off. The positive-going pulse from flip-flop 53 of approximately three milliseconds, duration is differentiated by a capacitor 192 with the negative-going spike thereof being applied to the base of transistor Q14 through steering diode 193. Normally, the base of transistor Q14 is placed at substantialy ground potential in view of the positive voltage drop across resistor 195 which occurs as a result of the transistor Q15 being in a conductive state. In the presence of the negative-going spike, transistor Q14 is caused to conduct while transistor Q15 is cut off for a period of approximately thirty milliseconds. A negative-going output pulse which is approximately thirty milliseconds in duration because of the values selected for the elements included in flip-flop 55 and including capacitor 198 is applied to trigger generator 89 and to the switch and relay control circuit 57. Such negative-going output pulse is derived from the collector of transistor Q15 and through resistor 195.

The negative-going output pulse mentioned above is applied to the base of a transistor Q17 included with trigger generator 89 through a steering diode 200 and a capacitor 201. Transistor Q17, normally being in a cut off state, is rendered conductive therein which is approximately three hundred microseconds. In the conductive condition of transistor Q17, a positive-going output is derived from the collector thereof and one side of resistor 203 which is applied to reversible counter 83 according to the state of direction flip-flop 85.

Flip-flop 85 is provided for the purpose of connecting the positive-going output pulses supplied from trigger generator 89 to the counter 83 for causing counter 83 to either count in a forward or reverse direction. To accomplish this, flip-flop 85 includes one transistor Q18 which is normally conductive for forward counting and another transistor Q19 which is normally in a nonconducting state, but which is operated to a conductive state for causing reverse counting in counter 83.

With the assumption in mind that the first wheel of a locomotive for a passing train operates wheel detector WD1, flip-flop 85 is in the state where transistor Q18 is conductive while transistor Q19 is cut off. In this state, the collector of transistor Q18 is at a substantially positive (+) potential due to the voltage drop across a resistor 205 which causes a diode 206 to be reverse biased. The nonconductive state of transistor Q19 causes its collector circuit to be placed at a substantially negative (−) potential through a resistor 208 which causes a diode 209 to be forward biased. The reverse biasing of diode 206 and the forward biasing of diode 209 in this manner permits the positive-going output derived from trigger generator 89 to be applied over the forward bus 210 to the reversible counter 83 for causing a count registration of "1."

Reversible counter 83 is comprised of a plurality of silicon controlled rectifiers each of which includes an anode circuit, a cathode circuit and a gating circuit. In this embodiment, counter 83 includes silicon controlled rectifiers R0, R1, R2 and R3 which are, respectively, caused to conduct when the respective counts of "0," "1," "2" and "3" are registered by counter 83. In the present condition, rectifier R0 is caused to conduct inasmuch as its gating circuit is effective when a train is detected as entering the detection area. That is, when relay TR is deenergized in the usual manner, a (+) potential is supplied to the gate element of rectifier R0 through a circuit extending from (+), through back contact 212 of relay TR, through a capacitor 213, through a resistor 214, through a steering diode 215, to the gate element of rectifier R0. In this manner, rectifier R0 is made conductive and remains conductive even after the gating voltage has been removed. Current thus flows through rectifier R0 from (+), through a resistor 217, through rectifier R0 from anode to cathode, through a breakdown diode 218, to (—). The voltage drop across resistor 217, and in particular the voltage drop on the negative (—) side thereof, is applied through a resistor 220 to the negative (—) side of a diode 221 for forward biasing such diode 221.

Rectifier R1 having its gating circuit forward biased through the diode 221 is thus enabled to receive a gating voltage over forward bus 210 which has been supplied thereto in the manner described above. This positive-going gating voltage is supplied through a capacitor 223, through diode 221, through capacitor 225, to the gate element of rectifier R1 thus causing rectifier R1 to conduct in a manner similar to that described for rectifier R0. The conduction of rectifier R1 causes a voltage drop to be provided across resistor 227, the negative (—) portion of which is coupled through a capacitor 228 to the anode circuit of rectifier R0 which is effective to extinguish rectifier R0.

When rectifier R0 assumes its nonconductive state, a positive-going output pulse taken from one side of resistor 217 is supplied to the base of a transistor Q21 through a resistor 230, through a capacitor 231 and a resistor 232 to cause transistor Q21 to assume a cut off condition. Normally, transistor Q21 is in a conductive state according to the negative (—) energy supplied to its base from (—) and through resistors 234 and 232. In the cut off state of transistor Q21, a negative-going output pulse is derived from its collector and through resistor 235 which is supplied to gate clamp 84.

With respect to the above described operation for producing a first axle pulse, it should be obvious that this is produced irrespective of the direction of a passing train. It is only required that a wheel come within the presence of wheel detector WD1 for producing the output pulses therefor as described above.

*Locomotive detection and control circuits*

In order that a first axle pulse produced in the manner described above be effective to control train car flip-flop 74, the locomotive for a passing train must already have been detected. In other words, the first axle pulse which is produced must be for a first railway car succeeding the locomotive.

When the initial locomotive and one or more other successively following locomotives appear, however, at the radiometer location and the motor or gear box of each such locomotive is adjacent coil loop 17, a change in frequency is amplified by amplifier 79 and detected by frequency discriminator 80, as briefly mentioned above. The detected and amplified change in frequency is then amplified once again by amplifier 82 and applied to gate clamp 84 as a negative-going output signal. This is shown in FIG. 1A by block diagram.

Referring to FIG. 4A, it is seen that the gate clamp 84 includes a transistor Q24 which normally is in a nonconductive condition. The appearance of the negative-going output signal from amplifier 82 places the base of transistor Q24 at a negative (—) potential according to the biasing circuit including resistors 238 and 239. When the negative-going first axle pulse is applied from first axle pulse control 87 to gate clamp 84 through capacitor 241, it is ineffective as long as transistor Q24 is in a conductive condition in that transistor Q24 effects a clamping thereof through resistor 245. Thus, train car flip-flop 74 remains in the normal condition where transistor Q26 is in a nonconductive state while transistor Q27 is in a conductive state.

In the normal condition of flip-flop 74, a positive-going output signal is derived from the collector of transistor Q27 and the positive (+) side of a resistor 243 included in the collector circuit of transistor Q27. This positive-going output signal is applied to the AND gates AGB, AGCC and AGA. As long as such positive-going output pulse is applied to such AND gates AGB, AGCC and AGA, they remain effective to block the passing of voltage output signals from respective radiometer detectors RD1 and RD2 as well as a negative-going car count pulse which will be described more fully hereinafter.

As soon as the first axle pulse control circuit 87 is operated by the first wheel of a car following the locomotive, the locomotive detection circuit including coil loop 17 is ineffective to control transistor Q24 to a conductive state, thus permitting the first axle pulse to be applied through capacitor 241, resistor 245, and diode 246 to the base of transistor Q26. This negative-going output pulse causes transistor Q26 to become conductive which causes its collector to be placed at a positive (+) potential due to the voltage drop across a resistor 248. This positive (+) voltage at the collector of transistor Q26 biases the base of transistor Q27 to a positive (+) potential through resistors 250 and 251 which causes transistor Q27 to become cut off. In this condition of flip-flop 74, a negative-going output pulse is provided at the collector of transistor Q27 and through resistor 243 which is applied to AND gates AGB, AGCC and AGA to render them noneffective for blocking the output pulses mentioned above.

As the train passes the radiometer location and coil loop 17, sufficient energy may be induced in coil 17 to cause oscillator 78 to effectively detect another locomotive. This may be caused by the presence of at least one other locomotive within the train. The detection in this manner does not, however, have any effect upon the operation of flip-flop 74, as described, in that it remains in its operated condition until the passing train leaves the detecting zone as defined by the energization of relay TR once again. During the time that a train is present within the detection zone, a biasing circuit is completed for preventing the application of a negative (—) potential to the base of transistor Q27. This biasing circuit extends from (+), through back contact 75 of relay TR, through diode 253, through a resistor 254, to (—). The drop across resistor 254 causes a diode 256 in the base circuit of transistor Q27 to be reverse biased. Relay TR is energized when the train leaves the detection zone thus removing the biasing circuit and permitting diode 256 to be forward biased for applying a negative (—) potential to the base of transistor Q27 and thus causing a reversal of operation for transistors Q26 and Q27 to a normal condition.

*Car detection and count control circuits*

During the passage of a train, irrespective of the direction thereof, the digital recorder 50 is controlled to the extent that it registers by counts, without printing, the number of cars which pass the radiometer location. This is accomplished by counting the number of wheels which effect an operation of wheel detectors WD1 and WD2 as they pass the respective locations. In this respect, wheel detector WD2 may be located nine feet to the left of wheel detector WD1 with an obvious reverse counting operation becoming effective, but with the attending advantages being retained.

It will be recalled from what has been stated above that wheel detectors WD1 and WD2 are disposed along the rail RA approximately nine feet apart. This permits two axles on a two axle truck or three axles on a three axle truck to pass one of such wheel detectors before passing the other depending on train direction. For a train traveling over rails RA and RB from left to right, wheel detector WD1 would be operated as described above for each wheel appearing on rail RA. For each railway car, the circuits of FIGS. 2A and 2B would become effective in the manner described above for causing counter 83 to register the number of counts representative of the wheels for one truck of a railway car. In this connection, the operation of rectifiers R1, R2 and R3 in sequence indicates that a three wheel truck has been counted. Alternately, only rectifiers R1 and R2 may be sequentially controlled which represents a two wheel truck which has been counted. Should it be desired to provide a counting circuit for counting wheels for trucks having more than three wheels, it is only necessary to provide an additional stage such as each of the rectifiers R1, R2 and R3.

It has been described how rectifier R1 is provided with a gating voltage from trigger generator 89 over the forward bus 210 for causing conduction thereof. Similarly, rectifiers R2 and R3 are separately provided gating voltages to respective gates in sequence according to the passage of wheels over wheel detector WD1. It is noted that the gating circuit for each of the rectifiers R1, R2 and R3 is biased according to the operation of the preceding rectifier. That is, rectifier R2 has its gating circuit biased according to the forward biasing of diode 258 by a negative (—) potential supplied through resistor 259 from the anode of rectifier R1, while the gating circuit for rectifier R3 is effective when diode 261 is forward biased by a negative (—) potential supplied from the anode of rectifier R2 and through a resistor 263. When rectifier R2 is supplied with a gating voltage and is made conductive, a negative (—) potential is coupled to the anode of rectifier R1 through capacitor 265 according to the potential drop across resistor 266. Similarly, a negative (—) potential is coupled to the anode of rectifier R2 through capacitor 268 according to the potential drop across resistor 270. Thus, the preceding rectifier is cut off by this coupling arrangement. It is noted that lamps L0, L1, L2 and L3 are located in the anode circuits of respective rectifiers R0, R1, R2 and R3. These lamps may be located in some convenient location so as to apprise an attending operator of the wheel count registration with respect to a locomotive or railway car.

As the locomotive continues to pass the radiometer detector location and, more particularly, the first group of wheels therefor, wheel detector WD2 is repeatedly effective to provide control of reversible counter 95 to register the number of counts representative of wheels in the first group. Referring now to FIG. 3, the negative-going output signal taken from the collector circuit of transistor Q7 included with multivibrator 93 as described above is applied to trigger generator 94 which causes a shortened positive-going output pulse of approximately three hundred microseconds to be produced similar to that described for trigger generator 89. Such positive-going output pulse is applied to the forward trigger bus of reversible counter 95, but only according to the condition of direction flip-flop 97.

It is assumed that the locomotive of a train is passing the radiometer location with flip-flop 97 being in the condition where an included transistor Q28 is conductive while another transistor Q29 is in a cut-off state. Similarly to that described for flip-flop 85, a diode 272 is reverse biased according to a positive (+) potential being derived from the collector and one side of a resistor 273 of transistor Q28. The positive-going output pulse supplied from trigger generator 94 is then supplied to reversible counter 95 through a diode 274 inasmuch as it is forward biased according to a negative (—) potential being supplied thereto through resistors 275, 276 and 277. The reversible counter 95 is then controlled similarly to that described for counter 83 to register a count representative of each respective wheel of the first group of wheels on a passing locomotive.

Referring to FIGS. 2A and 2B, it will now be described how the reverse reset control 99 is effective to control direction flip-flop 85 as well as flip-flop 97. More particularly, reverse reset control 99 includes, in this embodiment, two gating circuits each of which is rendered ineffective only by corresponding rectifier outputs provided coincidentally from counters 83 and 95. For each two axle truck, rectifiers R2 for both counters 83 and 95 are controlled to a conductive condition as all wheels for such truck are detected as passing wheel detectors WD1 and WD2. With rectifier R2 for counter 83 being in a conductive condition, a gating circuit which is normally effective and which extends from (+), through resistor 266, over wire 277, through a diode 278 included with control 99, through a resistor 279, included with control 99, to (—) is rendered ineffective. Normally, diode 278 is forward biased with diode 285 being reverse biased, but during the conductive condition of rectifier R2, the drop across resistor 266 places such diode in a reverse biased condition thus rendering the gating circuit ineffective. Similarly, a gating circuit including diode 280 of control 99 is rendered effective according to a similar rectifier R2 for counter 95 being in a cut off condition, but which is rendered ineffective when such rectifier is made conductive.

When the count registration condition is reached where both diodes 278 and 280 are reverse biased, circuits are then completed for changing the condition of flip-flop 85. More particularly, negative (—) energy is connected to the base of transistor Q19 to cause conduction thereof through a circuit which extends from ground, through resistor 282, through diode 283, through resistor 284, through diode 285, through resistor 279, to (—). With such biasing circuit being effective, transistor Q19 is caused to conduct which causes ground to be applied to the base of transistor Q18 according to the biasing circuit connecting the collector of transistor Q19, through resistors 287 and 288, to ground. In this state of flip-flop 85, positive (+) energy is applied to one side of diode 209 through resistor 290 to reverse bias such diode 209, while negative (—) energy is applied to one side of diode 206 through a resistor 291 to forward bias such diode 206. A last group of wheels on the assumed locomotive which passes wheel detectors WD1 and WD2 then causes wheel detector outputs to be supplied to a reverse trigger bus 294 through diode 206.

If it is assumed that the counters 83 and 95 register forward counts of three, respective rectifiers R3 become conductive to provide control of a similar gating circuit included in control 99 to change the state of flip-flop 85 as described above. This gating circuit includes diodes 296 and 297 which connects respectively to counters 83 and 95 each of which when forward biased is effective to reverse bias a diode 298. In the reverse biased condition of diodes 296 and 297 which respectively is representative of similar rectifiers R3 being in a conductive condition, flip-flop 85 is controlled to a reversed operating condition, i.e., transistor Q19 is made to conduct while transistor Q18 is cut off.

It should be noted that control 99 also includes two similar gating circuits (not shown) which are used with direction flip-flop 97 shown in FIG. 3 to bias the base of transistor Q29 similar to that described for transistor Q19.

With direction flip-flop 85 now being in an opposite state such that reverse trigger bus 294 is effective for controlling counter 83 while a similar reverse trigger bus 313 is effective for controlling counter 95, such counters 83 and 95 are effective to count in a reverse direction according to the application thereto of output pulses received from respective wheel detectors WD1 and WD2.

In the condition of counter 83 where rectifier R3 is in a conductive state, the first positive-going output pulse supplied from trigger generator 89 through diode 206 and over reverse trigger bus 294 is applied through a capacitor 301, a diode 302 which is forward biased due to the conduction of rectifier R3 with a negative (—) potential being supplied to its negative (—) side through resistor 303 from the anode of rectifier R3, through capacitor 304 to the gate of rectifier R2. Such gating of rectifier R2 causes conduction thereof which couples a negative-going output signal to the anode of rectifier R3 through capacitor 268 to thus cause rectifier R3 to be cut off. Rectifiers R1 and R0 sequentially become conductive by similar circuits described for rectifier R2 each of which is dependent upon the conduction of the succeeding rectifier. That is, a diode 306 in the gating circuit of rectifier R1 is forward biased according to the negative (−) potential being supplied from the anode of rectifier R2 through resistor 307. Similarly, the gating circuit for rectifier R0 becomes effective when a diode 308 is forward biased by a negative (−) potential supplied from the anode of rectifier R1 and through a resistor 310.

Reversible counter 95 is similarly controlled by the detailed circuits shown in FIG. 3 according to the locomotive passing wheel detector WD2 which causes trigger generator 94 to provide a positive-going output signal for each wheel passing over detector WD2. In this connection, and according to the reverse condition of flip-flop 97, forward trigger bus 312 is ineffective due to the reverse biased condition of diode 274 for supplying forward counts to counter 95, while reverse trigger bus 313 is effective due to the forward biased condition of diode 272 provided according to the negative (−) energy supplied through resistor 314 from the collector of transistor Q28. When flip-flop 97 is controlled, however, to the reverse operating condition, i.e., transistor Q28 cut off and transistor Q29 conducting, a positive-going output signal is taken from one side of resistor 275 and supplied to the base of a transistor Q31 included with car count pulse control 103. Normally, transistor Q31 is biased into conduction according to the negative (−) energy supplied through biasing resistor 316. The presence of the positive-going output signal on the base of transistor Q31 and coupled thereto through capacitor 317 causes transistor Q31 to be cut off. A negative-going output signal is then derived from the collector of transistor Q31 and applied to the gate AGCC. As has been described above, train car flip-flop 74 remains in its normal condition, i.e., transistor Q26 cut off and transistor Q27 conducting, so as to render AND gate AGCC ineffective when a pulse is received from car count pulse control 103. In this state of flip-flop 74, a positive-going output signal is supplied to AND gates AGB, AGA and AGCC for rendering them ineffective. In this connection and with reference to FIG. 4A, a diode 318 included with AND gate AGCC and a diode 319 included with AND gate AGA are forward biased according to the presence of the positive-going output signal received from flip-flop 74. Thus, the car count pulse which is applied through capacitor 321 and resistor 322 included with AND gate AGCC is not applied to the one shot multivibrator 105 as long as diode 318 is forward biased.

*Car count registration and control circuits*

It has been described above how the car count pulse is produced even for a locomotive. When the flip-flop 74 remains uncontrolled by the presence of a first axle pulse and the presence of a locomotive detection pulse, however, AND gates AGB, AGA and AGCC are effective to prevent passage of the car count pulses. When the first railway car succeeding the locomotive causes a first axle pulse to be produced in the manner described above by first axle pulse control 87, it is applied to the flip-flop 74 through gate clamp 84 and, more particularly, to the base of transistor Q26 thereof. This causes the normally cut off transistor Q26 to be rendered conductive in that the first axle pulse is a negative-going output signal. The base of transistor Q27 is placed at a positive (+) potential because of the voltage drop across resistor 248 in the collector circuit of transistor Q26 and which is applied through the biasing circuit including resistors 250 and 251 to the base of transistor Q27. With transistor Q27 thus being cut off, diodes 318 and 319 in respective gates AGCC and AGA are reverse biased which thus permits the car count pulses as well as signals representative of overheated journal bearing conditions to be applied to respective multivibrators 105 and 121.

For each car count pulse which is produced by car count pulse control 103 representative of a railway car following all initial locomotives of a passing train, an output pulse is provided by one-shot multivibrator 105 which is employed to cause the operation of count solenoids CSA and CSB for registering counts. More particularly, a negative-going car count pulse is supplied through AND gate AGCC and applied to the base of a transistor Q32 included with multivibrator 105 which is normally in a conducting state. Such negative-going output pulse is supplied through steering diode 323 and is additionally employed to charge capacitor 324 through a resistor 325. The negative-going output pulse applied to the base of transistor Q32 causes such transistor to be cut off in that it is a NPN type transistor. Another transistor Q33 is biased into conduction according to the cutting off of transistor Q32 as a positive (+) potential is applied to the base of Q33 according to the biasing circuit completed from (+), through resistor 327, through resistor 328, through resistor 329, to (−). In addition, a negative (−) potential is applied to the emitter of transistor Q33 through resistor 331 while a positive (+) potential is supplied to the collector through resistor 332. A negative-going output signal is then derived from the collector of transistor Q33 which is approximately fifty milliseconds in duration according to the value of included elements including capacitor 324.

The negative-going output signal derived from multivibrator 105 is applied to Schmitt trigger 106 through OR gate ORG and over wire 334. As noted in FIG. 4A, OR gate ORG includes a resistor 335 and a steering diode 336 which is forward biased by the negative-going output signal. Schmitt trigger 106, being provided for amplifying and squaring the negative-going output signal derived from multivibrator 105, receives such signal on the base of a transistor Q35 through a resistor 337 and a capacitor 338. Transistor Q35, which is normally cut off, is rendered conductive by the application of such negative-going output signal to its base which causes the base of another transistor Q36, which is normally conductive, to be placed at a positive (+) potential through resistors 330 and 333. This biasing of the base of transistor Q36 causes it to be cut off during which time a negative-going output signal of approximately fifty milliseconds' duration is derived from its collector circuit and applied to multivibrator 108 as well as to the gating circuits of print control 116, count control 109 and abnormal temperature signal control 118.

Multivibrator 108 is employed, in response to the negative-going output signal received from Schmitt trigger 106, to provide a negative-going output signal of approximately seventy-five milliseconds' duration which is used to bias the gating circuit of count control 109 as well as providing an input to multivibrator 112. In multivibrator 108, a transistor Q38 is normally in a cut off condition while a second transistor Q39 is normally in a conductive condition. The application of the negative-going output signal from Schmitt trigger 106 to the base transistor Q38 through a capacitor 340 and a steering diode 341 causes transistor Q38 to become conductive. As transistor Q38 assumes its conductive condition, a capacitor 343 is charged according to a positive (+) voltage drop across resistor 344 located in the conducting circuit of transistor Q38 through resistor 345. The presence of capacitor 343 in its charged condition permits transistor Q38 to remain conductive for approximately seventy-five milliseconds while maintaining transistor Q39 cut off such period. A negative-going output pulse derived from the collector of transistor Q39 is applied to one side of a diode 347 included with count control 109 over a wire 348 through a resistor 349 to forward bias such diode 347 during the seventy-five millisecond duration of such pulse. As was noted above, the fifty millisecond pulse derived from Schmitt trigger 106 is applied to count control 109 and this is applied thereto over wire 350. At the end of such fifty millisecond pulse, i.e., when transistor Q36 of Schmitt trigger 106 conducts and the output pulse then goes positive, it is applied through diode 347 and a capacitor 351 to the gate element of a silicon controlled rectifier CR. Rectifier CR, having its cathode normally biased to a small positive (+) potential by a circuit including a diode 353 and a resistor 405 and its anode connected to (+) through a resistor 352 and the windings of count solenoids CSA and CSB, is rendered conductive. Solenoids CSA and CSB are thus energized for a sufficient period of time to register a count representative of the railway car of locomotive which has caused the car count pulse to be produced.

It is noted that a full wave power supply 355 is connected to the anode of rectifier CR through a diode 354 which would provide a zero level voltage on the anode after at least one-half cycle of operation, while the cathode thereof is biased to a small positive (+) potential as noted above. To provide sufficient time for the count to be registered by the energization of count solenoids CSA and CSB, a control flip-flop 132 is controlled immediately upon the energization of rectifier CR and is employed to sustain energization of rectifier CR for a predetermined time which is sufficient to permit count registration.

Flip-flop 132 includes a transistor Q40 which is normally cut off and a second transistor Q41 which is normally conductive. When rectifier CR becomes energized, a negative-going output signal is taken from the anode of rectifier CR and applied to the base of transistor Q40 through a diode 357 and a capacitor 358 which is sufficiently negative to cause the conduction of transistor Q40. In this state of transistor Q40, a positive (+) potential is applied to the base of transistor Q41 from the collector of transistor Q40 through a resistor 359 causing a transistor Q41 to be cut off. Before transistor Q41 is cut off, however, a capacitor 360 in its collector circuit is charged by the negative-going output signal that is applied through capacitor 358. The charge on capacitor 360, in addition to the resistors in its obvious discharge path, allows flip-flop 132 to remain in this reversed condition for approximately one hundred milliseconds. At the conclusion of such one hundred milliseconds, flip-flop 132 returns to its initial condition, i.e., transistor Q40 being cut off and transistor Q41 conducting. During the conducting state of transistor Q40, however, a positive-going output signal is derived from the collector of transistor Q40 and applied to the anode of rectifier CR through a resistor 362 and a diode 363 to sustain energization of rectifier CR. The full wave power supply 355 is effective at the conclusion of the one hundred milliseconds signal to cause a reversal of current flow in rectifier CR sufficient to cause deenergization thereof. The solenoids CSA and CSB are once again deenergized.

*Last axle detection and control circuits*

It has been described above how the reversible counters 83 and 95 are controlled to register the counts for each locomotive or each railway car in a passing train. It has also been described how the detection and registration of the second group of wheels for the second truck of a passing locomotive or railway car are effective to control the counters 83 and 95 in a reverse direction.

When such counters 83 and 95 are operated to the respective positions where similar rectifiers R0 become energized, negative-going output signals are provided respectively therefrom which are employed to reset respective direction flip-flop 85 and 97 to forward biased conditions. Referring to FIGS. 2A and 2B, and assuming rectifier R0 is controlled to an energized condition in the manner described above, a negative-going output signal is derived from one side of resistor 217 and applied to the base of transistor Q18 through resistor 230, over wire 365, through a steering diode 366 to the base of transistor Q18. This signal causes transistor Q18 to become conductive which causes the base of transistor Q19 to be placed at substantially ground potential thus cutting off transistor Q19.

Similarly, with reference to FIG. 3, a negative-going output signal is supplied from reversible counter 95 over wire 367 and through steering diode 368 to the base of transistor Q28 included with flip-flop 97. This causes transistor Q28 to become conductive while placing the base of transistor Q29 at a substantially ground potential thus cutting off such transistor Q29. Flip-flop 97 is then in a forward biased conditioned in readiness for directing positive-going triggering pulses from trigger generator 94 over forward trigger bus 312. As flip-flop 97 assumes this forward biased condition, a positive-going output is derived from one side of resistor 273 included in the collector circuit of transistor Q28 and is applied to the base of a transistor Q43 of the last axle pulse control 101 through a capacitor 369. Transistor Q43 is normally in a conductive state according to negative (—) energy being supplied to the base thereof through a biasing resistor 370. However, the presence of the positive-going output signal from flip-flop 97 on the base of transistor Q43 causes it to cut off. In such cut off condition, a negative-going output signal is derived from its collector and one side of a resistor 371 and applied to pulse delay 102.

Referring now to FIG. 4A, such negative-going output pulse is applied through the pulse delay 102 to flip-flop 48 which is employed to store an overheated journal bearing condition sensed by radiometer unit RD2. More particularly, the last axle pulse is employed to reset flip-flop 48 in order that such flip-flop 48 may be in the proper state for the next railway car appearing in the passing train at the detector location.

Flip-flop 48 includes a normally conductive transistor Q44 and a normally cut off transistor Q45. The application of the negative-going last axle pulse causes the base of transistor Q45 to be placed at a positive (+) potential according to the direction of steering diode 372; i.e., the trailing edge of such negative-going signal is employed. As long as transistor Q45 is cut off, however, the last axle pulse is ineffective to operate flip-flop 48. If, on the other hand, an overheated journal bearing condition has been detected which causes transistor Q44 to be cut off and transistor Q45 to be conducting, transistor Q45 would then be controlled to a cut off condition and transistor Q44 controlled to a conducting condition. It will be noted that the pulse delay 102 includes a variable capacitor 373 and a variable resistor 374 which, in combination, are employed to provide a sufficient delay of the negative-going last axle pulse so as to permit the last wheel which operates wheel detector WD2 on a train moving from the left to the right to be viewed by radiometers RD1 and RD2.

*Overheated journal bearing detection and control circuits*

It has been generally described with reference to FIGS. 1A and 1B how an overheated journal bearing condition is registered by radiometers RD1 and RD2 and that such registrations are stored by respective flip-flops 47 and 48. These storages are then employed to control respective print controls 115 and 116 which thus effects a printing of digital recorder 50.

The manner in which this is effected may be described in more detail by referring to FIGS. 4A, 4B and 4C. In referring to FIG. 4A, it is noted that the output signal from radiometer detector RD2 is supplied to a voltage signal preamplifier 30 which amplifies such signal and further applies it to voltage signal amplifier 34. Such signal is further amplified by amplifier 34 which includes a gain setting control. The amplified signal is then applied to hub signal storage circuit 37 where it is stored for a period as determined by the operation of flip-flop 55. It is noted that this type of operation is shown and described in the above noted pending application, Ser. No. 57,015. For purposes of description here, it is sufficient to note that a negative-going thirty millisecond signal is derived from circuit 37 and applied to pulse height detector 44.

Pulse height detector 44 includes a unijunction type transistor Q46 which includes an emitter E, and two bases B1 and B2. The negative-going output signal derived from circuit 37 is applied to base B1 through a steering diode 364 and capacitor 375. It is noted that variable resistor 376 is provided to vary the amplitude of incoming signals which are effective to cause transistor Q46 to conduct. Such negative-going output signal is effective to cause transistor Q46 to become conductive for a predetermined interval with a current flowing from (+), through a resistor 378, through transistor Q46 from the emitter E to base B1, through a resistor 379, to (−). A voltage drop occurs across resistor 378 with the negative-going output signal thereof being applied through a capacitor 380 to the base of transistor Q45 included with flip-flop 48 through a steering diode 381. As mentioned above, flip-flop 48 in its normal state has transistor Q44 conducting and transistor Q45 cut off. The presence of the negative-going output signal derived from detector 44 on the base of transistor Q45 causes it to conduct which places the base of transistor Q44 at a substantially positive (+) potential thus causing such transistor Q44 to cut off. In this manner, a storage of an overheated journal bearing condition for at least one axle on one side of a railway car is provided.

With the appearance of a negative-going last axle pulse, transistor Q45 being conductive is cut off and a negative-going output signal is derived from its collector and one side of the resistor 383 and applied to the base of a transistor Q47 included with one-shot multivibrator 121. The negative-going output signal is applied, however, through AND gate AGA which is controlled, as explained above, by the condition of train car flip-flop 74. For the first railway car following all initial locomotives and each railway car or locomotive thereafter, AND gate AGA, in this example, is effective to pass the negative-going output signal to multivibrator 121. The steering diode 385 permits only the negative-going output signal to be effectively applied to the base of transistor Q47 through a capacitor 386 and a resistor 387. A second transistor Q48 included in multivibrator 121 is rendered conductive according to the negative-going output signal from flip-flop 48. More particularly, the negative-going output signal is applied to the base of transistor Q47 which causes such transistor to be cut off in that it is a NPN type transistor which condition causes a negative (−) potential to be applied to the emitter of transistor Q48 through a resistor 389. In addition, a positive (+) potential is applied to the base of transistor Q48 inasmuch as a biasing circuit including resistor 390 is effective to cause conduction thereof. The multivibrator 121 remains in this state for a period of approximately one hundred milliseconds in that a capacitor 391 is charged through a resistor 392 by the negative-going input signal through diode 385. The time of discharge for capacitor 391 thus limits the time that multivibrator 121 is in this opposite state.

A negative-going output signal is taken from the collector circuit of transistor Q48 and applied to Schmitt trigger 106 through a resistor 393 and a diode 394 included in OR gate ORG. This negative-going output signal which is applied from OR gate ORG over wire 334 to the trigger 106 is employed to cause trigger 106 to provide a negative-going output signal of approximately one hundred milliseconds in duration. It has been generally described above how Schmitt trigger 106 is controlled by the fifty millisecond negative-going output signal derived from multivibrator 105. Similar control thereof is effected by the one hundred millisecond negative-going input representative of an overheated journal bearing condition.

As described above, the negative-going output signal from Schmitt trigger 106 is effective to control multivibrator 108 for a period of approximately seventy-five milliseconds during which time the count control 109 is biased. In addition to biasing control 109, a negative-going output signal from multivibrator 108 is applied to multivibrator 112 and, more particularly, through a capacitor 395 and a steering diode 396 to the base of a transistor Q49. Steering diode 396 is effective to the extent that only the trailing edge or positive-going portion of the seventy-five millisecond pulse is effectively applied to the base of transistor Q49 to cut off such transistor Q49. A second transistor Q50 which is normally cut off is controlled to a conductive state isasmuch as its base is biased to a more negative (−) potential according to the cutting off of transistor Q49 through a resistor 398. Multivibrator 112 is effective to remain in this opposite state for approximately seventy-five milliseconds in that a capacitor 399 is charged by the positive-going trailing edge of the negative-going output signal derived from multivibrator 108 and is effective to maintain the opposite conditions of transistors Q49 and Q50 until it is sufficiently discharged to cause such transistors Q49 and Q50 to revert to their original conditions in the usual manner.

During such opposite condition of multivibrator 112, a negative-going output signal is derived from the collector circuit of transistor Q49 and is applied to the biasing circuits of abnormal temperature signal control 118 and print control 116 over wire 400. More particularly, a capacitor 401 in the biasing circuit of control 118 is charged to a negative (−) potential through resistors 412 and 413 which forward biases a diode 402 in the gating circuit for rectifier SR of control 118. Similarly, a capacitor 403 in the control 116 is charged to a negative (−) potential through resistors 411 and 414 for forward biasing a diode 404 in the gating circuit of rectifier PCR for control 116. Inasmuch as the forward biasing of diodes 402 and 404 is effective as the conclusion of the negative-going output signal derived from Schmitt trigger 106 and which is applied over wire 350, rectifiers SR and PCR are gated into conduction.

Energization of rectifier SR causes a lamp 129 to be illuminated by the completion of a circuit extending from (+), through button B1, through the filament of lamp 129, through rectifier SR from anode to cathode, to the biasing energy provided by the current including diode 353 and resistor 405. The lighting of lamp 129 is employed to apprise an attending operator of a overheated journal bearing condition, the exact location of which being determined by referring to digital recorder 50 and analog recorder 40. Rectifier SR may be then cut off by opening its energizing circuit through the actuation of button B1. This also extinguishes lamp 129.

The application of the negative-going output signal to the gating circuit of rectifier PCR causes such rectifier to be energized for causing count print solenoid CPSA to be energized for causing a print to be made similar to that shown in FIG. 5 for column B. In order that the recorder 50 is effective to provide such print, control print flip-flop 132 is effectively controlled in the manner described above for rectifier CR to sustain energization of rectifier PCR for approximately one hundred milliseconds. At the conclusion of such one hundred milliseconds, flip-flop 132 is operated to the condition where a diode 407 is reverse biased which permits a diode 408 to become effective according to a full wave power supply 355 to cut off rectifier PCR. During the energization of rectifier PCR, however, an additional circuit is completed to time print solenoid TPS for causing the energization thereof and also to the control solenoid of a bell 138, this circuit being completed through diode 410. Along with the printing of the particular car number, the time which is recorded is also printed as shown in FIG. 5 and in addition an audible alarm by bell 138 is provided. These operations are provided during the approximate one hundred milliseconds' duration of operation for flip-flop 132 as described.

Switch and relay control circuit

With reference to FIGS. 1A and 2A, it may now be described how the relays R, RP and TRP are controlled according to the passing of wheels over wheel detector WD1. It has been generally described with reference to FIG. 1A how the flip-flop 55 is controlled for thirty milliseconds according to the passage of each wheel over wheel detector WD1. This has been more specifically described with reference to FIG. 2A.

Referring to FIG. 2A, it will be recalled that a negative-going output signal is derived from the collector of transistor Q15 and one side of resistor 195 which is applied to trigger generator 89. This negative-going output signal is also applied to the base of a transistor Q51 included in circuit 57 which is normally in a conductive state. A second transistor Q52 is biased by transistor Q51 and is also in a normally conductive state. A third transistor Q53 is biased by transistor Q52 to the extent that it is cut off which causes the relay R connected in its collector circuit to be deenergized. In this connection, transistors Q52 and Q53 form a Schmitt trigger circuit.

The application of the negative-going output signal from flip-flop 55 to the base of transistor Q51 through steering diode 412 and resistors 413 and 414 cause transistor Q51 to be cut off. The biasing circuit for transistor Q52 then becomes ineffective to permit such transistor Q52 to remain conductive inasmuch as its base goes from a substantially negative (—) potential to substantially ground through resistor 415. The cutting off of transistor Q52 then biases the base of transistor Q53 to a more negative (—) potential according to a potential drop across 416 thus causing transistor Q53 to become conductive. The conductive condition of transistor Q53 then places its collector at substantially around potential which completes a circuit through the winding for relay R to (—) for energizing relay R. In the energized condition of relay R, a previously charged capacitor 59 is discharged through a front contact 60 of relay R to sustain control of circuit 57. The charged condition of capacitor 59 thus permits relay R to remain energized for a limited period in the order of seven seconds after the negative-going output signal from flip-flop ceases. This operation is provided to detect the stoppage of a passing train over the detector location.

The energization of relay R causes relay RP to be energized as described above which energization permits the shutters provided with radiometers RD1 and RD2 to be moved from the viewing face of such radiometers RD1 and RD2. In addition, relay TRP is maintained energized through front contact 68 of relay RP. This circuit is provided in addition to the circuit including back contact 70 of relay TR mentioned above inasmuch as the wheel detector WD1 may be placed much closer to either end of the defined track circuit than is shown in FIG. 1A. Relay TRP is thus maintained energized sufficiently long to permit proper operation of digital recorder 50.

When relay TRP is initially energized, a print of "000" is made for each side of a passing train in addition to the time so as to indicate the entrance of a train into the defined detection zone. Referring to FIG. 4C, a more detailed description may be provided to effect this operation. More particularly, when relay TRP is energized, (+) is supplied to the gating circuits of rectifiers PCR for both print controls 115 and 116. In particular, (+) is supplied to the gating circuit of rectifier PCR for print control 116 by the circuit extending from (+), through front contact 415 of relay TRP, through a capacitor 416, through diode 417, through a resistor 418, to the gate element of rectifier PCR. Rectifier PCR is thus energized and is maintained energized for approximately one hundred milliseconds in accordance with the control of flip-flop 132 as described above. A similar rectifier PCR for print control 115 is simultaneously energized so as to energize count print solenoids CPSA and CPSB simultaneously. Thus, the print of "000" for both columns A and B is effected. Also, time print solenoid TPS is energized as described above through diode 410 included with print control 116 for also printing the time of train entrance.

When the train is detected as leaving the defined detection zone and relay RP is deenergized, relay TRP is deenergized which causes an operation of digital recorder 50 for printing the total number of cars detected as being within the passing train as well as the time of exiting from the defined detection zone. More particularly, positive (+) energy is supplied to the gating circuit of rectifier PCR by a circuit extending from (+), through back contact 415 of relay TRP, through capacitor 420, through a diode 421, through resistor 418, to the gate element of rectifier PCR for print control 116. A similar circuit is completed to print control 115. Thus, similar rectifiers PCR for print controls 115 and 116 are controlled for causing the simultaneous energization of control print solenoids CPSA and CPSB. The total counts registered through the operation of count control 109 and the energizations according thereto of count solenoids CSA and CSB are printed to indicate the number of railway cars in the passing train. In addition, the time print solenoid TPS is energized as described above for printing the time of exit of the train from the defined detection zone.

In order that these operations may be effected before the digital recorder 50 is controlled to a reset condition, a reset control delay 134 is effective for a predetermined interval of approximately three hundred fifty milliseconds according to the deenergization of relay TRP. When relay TRP is deenergized, (+) is supplied to the base of a normally energized transistor Q55 by a circuit extending from (+), through back contact 422 of relay TRP, through a diode 423, through a capacitor 424 to the base of transistor Q55. In addition, this circuit is extended through a resistor 426, to (—) so as to charge capacitor 424 for effecting control of transistor Q55 for the approximate three hundred fifty milliseconds. During this three hundred fifty milliseconds period, a negative-going output signal is derived from the collector of transistor Q55 and one of side of a resistor 427 which is applied to the gate of rectifier RCR included with recorder reset control 135. The negative-going output signal is ineffective to gate rectifier RCR until such time as transistor Q55 becomes conductive, i.e., at the conclusion of the three hundred fifty milliseconds time duration. When the collector of transistor Q55 then goes positive (+) due to the voltage drop across resistor 427, this positive-going output signal is applied to the gate of rectifier RCR through diode 429 and capacitor 430 to cause rectifier RCR to be energized.

In the energized condition of rectifier RCR, a motor M and a reset coil RS included in the digital recorder 50 and, more particularly, in the anode circuit of rectifier RCR are energized for returning recorder 50 to an initial condition in readiness for another train. In this operation, motor M controls a cam 111 which is effective after a predetermined interval to control a contact 432 included in the reset solenoid RS energizing circuit so as to cause deenergization of solenoid RS. The contact 432 placed in an actuated position due to the positioning of cam 111 connects negative (—) energy to one side of the motor M as well as to the anode of rectifier RCR through resistor 425. Rectifier RCR is thus cut off, while motor M is operated for a predetermined time which is sufficient to complete the reset operation of the digital recorder 50. Cam 111 is rotated during such time so as to cause contact 432 to become disengaged from the negative (—) energy thus stopping motor M.

It will be noted that various push buttons are provided with the disclosed embodiment of this invention. These push buttons may be separately actuated or used in multiple to test various and respective circuits of this embodiment. In FIGS. 1B and 4C, such push buttons B2, B3, B4 and B5 are provided respectively with print control 115, print control 116, count control 109 and recorder reset control 135. In FIGS. 2A and 3, similar push buttons B6 B7 and B8 are provided with amplifier 52, trigger generator 89, and amplifier 90 respectively for providing the controls representative of a passing train as described above.

*Modification*

FIG. 6 illustrates by block diagram the embodiment of the present invention employed with a telemetering type apparatus in order that the digital recorder 50 and its control apparatus 435 may be located at some point remote from the track side detection location. More particularly, the defined detection zone including the insulated joints 10–13 have the radiometer detectors RD1 and RD2 positioned by respective rails RB and RA. Wayside control apparatus 436 which is similar to that described is controlled by the radiometer detectors RD1 and RD2 and the other elements acted on by a passing train but not shown herein in detail. Outputs from the wayside control apparatus 436 are supplied to a wayside transmitting apparatus 437 which is adapted to effect a transmission over a suitable communication circuit CC to a remote station receiving apparatus 439. Receiving apparatus 439 is provided for receiving such information and translating it to the recorder control apparatus 435 to effect the control thereof in the manner described above with the subsequent control of digital recorder 50 being effectuated.

In the description provided above and as shown in the drawings, multivibrators 105, 120, 121, 108 and 112 are provided to reduce the number of connections between the apparatus 436 and apparatus 435 to a minimum. This reduction of connections is particularly desirable when using a telemetering type apparatus as illustrated in FIG. 6. Also, relay TRP would be located with apparatus 435 at a remote control office. Where apparatus 435 and recorder 50 are located at the wayside location, these multivibrators may be eliminated and direct connections may be employed.

Having described a journal temperature information recording system for trains as one specific embodiment of this invention and a modification thereof, we desire it to be understood that the various forms shown have been selected particularly to facilitate in the disclosure of this invention and not limit the number of forms that it may assume. We desire it to also be understood that various other modifications, adaptations and alterations may be made to the specific forms shown to meet the requirements of practice without in any manner departing from the spirit or scope of this invention.

What we claim is:

1. A system for digitally displaying the identity of each car in a passing train having at least one detected overheated journal comprising, in combination,
   (a) means located in close proximity to opposite rails of a length of railroad track for detecting each overheated journal on said passing train and storing a signal characterizing the detected overheated journal until reset to a non-storing condition,
   (b) counting means located relative to said means and the rails for detecting each car of said passing train and producing a car count signal and last axle signal therefor,
   (c) said means being responsive to each said last axle signal for resetting said means to its non-storing condition,
   (d) display registering means responsive to said counting means for accumulatively registering in sequence all of the car count signals and responsive to said means when storing a signal for digitally displaying the then registered car count total.

2. The system according to claim 1 and further including time gating means responsive to each car count signal produced for a first predetermined time for operating said display registering means to register that car count signal and further responsive to said means for a second predetermined time when storing a signal for operating said display registering means to digitally display the then registered car count total.

3. The system according to claim 2 wherein said second predetermined time exceeds said first predetermined time by a predetermined amount, said display registering means being responsive to said time gating means for digitally displaying the then registered car count total each time said time gating means is controlled for said second predetermined time, whereby said display registering means provides a digital display of the car number identity for each car in said passing train having at least one overheated journal.

4. The system according to claim 1 and further including locomotive detection means positioned relative to the overheated journal detecting means and the rails for detecting all initial locomotives in said passing train, said locomotive detection means being effective to render said display registering means inoperative to register a car count signal during detection of said initial locomotives and until said counting means detects a first car following said initial locomotives, whereby the registering of car count signals by said display registering means is initiated by the detection of the first car following the initial locomotives.

5. The system according to claim 4 in which said locomotive detection means includes bistable means effective in its abnormal operating condition to electrically couple said means and said counting means to said display registering means, said counting means being effective to produce a first axle signal for each locomotive and car within said passing train, said bistable means being operated to its abnormal operating condition responsive to the first axle signal produced by said counting means corresponding to a first car within said train immediately following all initial locomotives and the absence of locomotive detection by said locomotive detection means, train detecting means disposed along said length of railroad track and including the portion of such track along which said means is located for defining a detection zone, said bistable means being responsive to said train detecting means when said train leaves said detection zone for operating said bistable means to its normal operating condition.

6. A system for digitally displaying the identity of each car in a passing train having at least one detected overheated journal comprising, in combination,
   (a) means located in close proximity to opposite rails of a length of railroad track for receiving infrared energy emanating from each journal on said passing train and providing an electrical signal proportional to the amplitude thereof,
   (b) storage means responsive to each of said electrical signals corresponding to received radiation having at least a predetermined amplitude for operating said storage means to its storage condition,
   (c) counting means located relative to said means and the rails for detecting each car of said passing train and producing a car count signal and last axle signal therefor,
   (d) said storage means being responsive to each said last axle signal for resetting said storage means to its non-storing condition,
   (e) display registering means responsive to said counting means for accumulatively registering in sequence all of the car count signals and responsive to said storage means when storing an electrical signal for digitally displaying the then registered car count total.

7. The system according to claim 6 and further including audible alarm means responsive to said storage means when in its storage condition for providing an audible alarm of the detected overheated journal condition.

8. The system according to claim 6 and further including visual alarm means responsive to said storage means when in its storage condition for providing a visual indication of the detected overheated journal condition.

9. A system for digitally displaying the identity of each car in a passing train having at least one detected overheated journal comprising, in combination,
  (a) plural heat-responsive means mounted alongside opposite rails of a length of railroad track each for detecting each overheated journal on the corresponding side of said passing train and storing a signal characterizing the overheated journal until reset to a non-storing condition,
  (b) counting means located relative to said plural heat-responsive means and the rails for detecting each car of said passing train and producing a car count signal and last axle signal therefor,
  (c) said plural heat-responsive means being responsive to each said last axle signal for resetting said plural heat-responsive means to non-storing conditions,
  (d) display registering means having at least two separate display means each responsive to said counting means for accumulatively registering in sequence all of the car count signals and each responsive to a particular heat-responsive means when storing a signal for digitally displaying the then registered car count total for that separate display means only.

10. The system according to claim 9 in which said display registering means includes a third separate display means and time measuring means for establishing time in twenty-four hour time, said third display means being responsive to said time measuring means to register the time and effective during each time said display registering means is responsive to at least one of said heat-responsive means for displaying the time that detection of the overheated journal occurred.

11. A system for digitally displaying the identity of each car in a passing train having at least one detected overheated journal comprising, in combination,
  (a) plural heat-responsive means mounted alongside opposite rails of a length of railroad track each for receiving radiation from each journal on the corresponding side of said train passing thereby and providing an electrical signal proportional to the amplitude thereof,
  (b) storage means individual to each of said heat-responsive means responsive to each of the electrical signals coupled thereto corresponding to received radiation of at least a predetermined amplitude for operating that storage means to its storage condition,
  (c) counting means located relative to said plural heat-responsive means and the rails for detecting each car of said passing train and producing a car count signal and last axle signal therefor,
  (d) both of said storage means being responsive to each said last axle signal for resetting such storage means to non-storing conditions,
  (e) display registering means having at least two separate display means each responsive to said counting means for accumulatively registering in sequence car count signals for the different cars in said passing train and each further responsive to a particular one of said storage means when it is in its storage condition for digitally displaying the then registered car count total corresponding to the side of said passing train and the car therein having the detected overheated journal.

12. The system according ot claim 11 and further including time gating means responsive to said counting means for each car count signal produced thereby for a first predetermined time for operating said display registering means to register that car count signal and further responsive to either of said storage means for a second predetermined time when storing a signal for operating the corresponding separate display means of said display registering means to digitally display the then registered car count total.

13. A system for digitally displaying the identity of each car in a passing train having at least one detected overheated journal comprising, in combination,
  (a) means located in close proximity to opposite rails of a length of railroad track for detecting each overheated journal on said passing train and storing a signal characterizing the overheated journal until reset to a non-storing condition,
  (b) train detecting means disposed along said length of railroad track and including the portion of such track along which said means is located for defining a detection zone in which said passing train is detected,
  (c) counting means located relative to said means and the rails for detecting each car of said passing train and producing a car count signal and last axle signal therefor,
  (d) said means being responsive to each said last axle signal for resetting said means to its non-storing condition,
  (e) display registering means responsive to said counting means for accumulatively registering in sequence all of the car count signals and responsive to said train detecting means when detecting said train upon entering said detection zone for displaying a zero car count total and further responsive thereto when said train leaves said detection zone for displaying the then registered car count total, said display registering means being responsive to said means when storing a signal for digitally displaying the then registered car count total.

14. The system according to claim 13 in which said means includes storage means individual to the detecting means for each side of said railroad track each for storing a signal characterizing the detected overheated journal until reset to a non-storing condition, each said storage means being responsive to each said last axle signal for resetting that storage means to its non-storing condition, said display registering means being responsive to each of said storage means in its storing condition for digitally displaying the then registered car count total corresponding to the side of said railroad track on which the overheated journal is detected.

15. A system for displaying the identity of each car in a passing train having at least one overheated journal and with respect to the axle thereof comprising, in combination,
  (a) heat-responsive means located in close proximity to opposite rails of a length of railroad track acted upon by received infrared energy from each passing car wheel journal for providing an electrical signal proportional to the amplitude thereof and storing a signal characterizing an overheated journal only until reset to a non-storing condition,
  (b) recorder means responsive to all electrical signals provided by said heat-responsive means for indicating graphically the relative amplitude of the electrical signals for all of the car wheel journals,
  (c) means located relative to said heat-responsive means and said rails for detecting each car of said passing train and resetting said heat-responsive means to its non-storing condition upon passage of the detected car by said means,
  (d) display registering means responsive to said means upon detection of each car in said passing train for accumulatively registering in sequence a count for each of the different cars in the train and responsive to said heat-responsive means each time it is operated to its storing condition for displaying the then registered car count total, (e) said recorder means being responsive to said display registering means when responsive to said heat-responsive means for causing said recorder means to graphically identify the car within said passing train having a detected overheated journal for which said recorder means provides a separate indication.

References Cited by the Examiner

UNITED STATES PATENTS

| | | | |
|---|---|---|---|
| 1,821,002 | 9/31 | Brooks et al. | 246—77 |
| 1,835,234 | 12/31 | McKeen | 246—77 |
| 2,829,267 | 4/58 | Howell | 246—169 |
| 2,856,539 | 10/58 | Orthuber et al. | 246—169 |
| 2,963,575 | 12/60 | Pelino et al. | 246—169 |

ARTHUR L. LA POINT, *Primary Examiner.*

LEO J. LEONNIG, EUGENE G. BOTZ, *Examiners.*